United States Patent [19]

Meier et al.

[11] 3,789,195

[45] Jan. 29, 1974

[54] DIGITAL COUNTER AND TIMER WITH MULTIPLEX SETTING AND READOUT

[75] Inventors: Carl H. Meier; Robert R. White, both of Scott, Iowa

[73] Assignee: Gulf Western Industries, Inc., New York, N.Y.

[22] Filed: May 9, 1972

[21] Appl. No.: 251,774

[52] U.S. Cl. ........ 235/92 T, 235/92 PE, 235/92 ST, 235/92 R, 328/48

[51] Int. Cl. .......... H03k 21/18

[58] Field of Search 235/92 T, 92 PE, 92 EA, 92 ST; 328/48

[56] References Cited

UNITED STATES PATENTS

| | | | |
|---|---|---|---|
| 3,636,319 | 1/1972 | Nixon | 235/92 EA |
| 3,564,217 | 2/1971 | Bounsall | 235/92 PE |
| 3,581,065 | 5/1971 | Yoshikazu Hatsukano | 235/92 EA |
| 3,646,371 | 2/1972 | Flad | 328/48 |
| 3,128,373 | 4/1964 | Phlieger | 235/92 T |

OTHER PUBLICATIONS

"Sequential Display" by J. D. Nicoud, Electronic Engineering Nov. 1969, pp. 40–41.

*Primary Examiner*—Daryl W. Cook
*Assistant Examiner*—Joseph M. Thesz, Jr.
*Attorney, Agent, or Firm*—Meyer, Tilberry & Body

[57] ABSTRACT

A digital counter used as a counter or timer and including at least first and second down counters and a network for loading a selected digit into each of the counters. A readout device is provided for each of the counters. A first signal connects the first down counters onto both of the readout devices and also energizes the readout device corresponding to the first counter. In a like manner, a second signal connects the second down counter to both of the readout devices and energizes the readout device corresponding to the second counter. There is also provided a signal for blocking the loading feature of the counters and enabling the counting function after a digit has been loaded into each of the down counters. The first and second signals also control the operation of the loading feature when there is no blocking signal so that the first down counter is loaded when the first signal is created, and the second down counter is loaded when the second signal is created.

34 Claims, 15 Drawing Figures

FIG. 3
| TRUTH TABLE DECODER | | | | | | | | |
|---|---|---|---|---|---|---|---|---|
| DIGIT (PULSE) | Q1 | $\overline{Q1}$ | Q2 | $\overline{Q2}$ | B1 $\overline{(Q1+Q2)}$ | B2 $\overline{(\overline{Q1}+Q2)}$ | B3 $\overline{(Q1+\overline{Q2})}$ | B4 $\overline{(\overline{Q1}+\overline{Q2})}$ |
| 1 | 0 | 1 | 1 | 0 | 0 | 0 | 1 | 0 |
| 2 | 1 | 0 | 1 | 0 | 0 | 0 | 0 | 1 |
| 3 | 0 | 1 | 0 | 1 | 1 | 0 | 0 | 0 |
| 4 | 1 | 0 | 0 | 1 | 0 | 1 | 0 | 0 |
| 5 | 0 | 1 | 1 | 0 | 0 | 0 | 1 | 0 |
| 6 | 1 | 0 | 1 | 0 | 0 | 0 | 0 | 1 |
| 7 | 0 | 1 | 0 | 1 | 1 | 0 | 0 | 0 |
| 8 | 1 | 0 | 0 | 1 | 0 | 1 | 0 | 0 |
FIG. 4
| TRUTH TABLE LATCH | | | | | | | |
|---|---|---|---|---|---|---|---|
| DIGIT | Q3 | $\overline{Q3}$ | Q4 | $\overline{Q4}$ | Q5 | $\overline{Q5}$ | $\overline{\overline{Q3}+Q4+\overline{Q5}}$ |
| 1 | 1 | 0 | 0 | 1 | 0 | 1 | 0 |
| 2 | 0 | 1 | 1 | 0 | 0 | 1 | 0 |
| 3 | 1 | 0 | 1 | 0 | 0 | 1 | 0 |
| 4 | 0 | 1 | 0 | 1 | 1 | 0 | 0 |
| 5 | 1 | 0 | 0 | 1 | 1 | 0 | 1 |
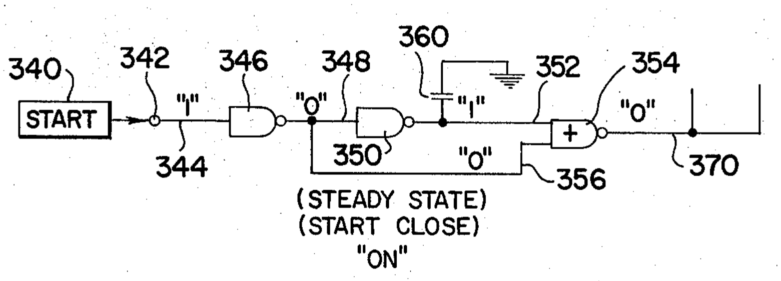
FIG. 5A
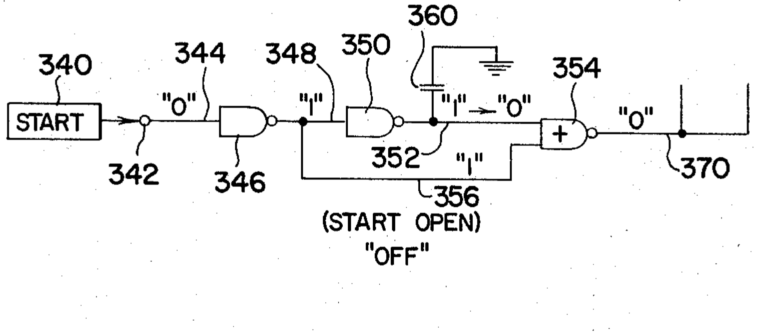
FIG. 5B

| TRUTH TABLE | | | |
|---|---|---|---|
| START (344) | ZERO COUNT (308) | 5 PULSE LATCH (374) | LOAD (160) |
| 1 | 0 | 0 | 1 |
| 0 | 0 | 0 | 1 |
| 1 | 1 | 0 | 1 |
| 0 | 1 | 0 | 1 |
| 1 | 0 | 1 | 1 |
| 0 | 0 | 1 | 1 |
| 1 | 1 | 1 | 0 |
| 0 | 1 | 1 | 1 |

FIG. 8A

| | SET CONDITION | | | | | | | | | | | | | |
|---|---|---|---|---|---|---|---|---|---|---|---|---|---|---|
| | UNIT 36 | | | | FLIP-FLOPS | | | | FLIP-FLOPS | $\bar{Q}$ TERMINALS | | | | READ OUT |
| SELECTED DIGIT | TWD1 | TWD2 | TWD3 | TWD4 | Q1 | Q2 | Q3 | Q4 | DIGIT | $\overline{Q1}$ | $\overline{Q2}$ | $\overline{Q3}$ | $\overline{Q4}$ | DIGIT |
| 0 | 0 | 0 | 0 | 0 | 1 | 1 | 1 | 1 | 15 | 0 | 0 | 0 | 0 | 0 |
| 1 | 1 | 0 | 0 | 0 | 0 | 1 | 1 | 1 | 14 | 1 | 0 | 0 | 0 | 1 |
| 2 | 0 | 1 | 0 | 0 | 1 | 0 | 1 | 1 | 13 | 0 | 1 | 0 | 0 | 2 |
| 3 | 1 | 1 | 0 | 0 | 0 | 0 | 1 | 1 | 12 | 1 | 1 | 0 | 0 | 3 |
| 4 | 0 | 0 | 1 | 0 | 1 | 1 | 0 | 1 | 11 | 0 | 0 | 1 | 0 | 4 |
| 5 | 1 | 0 | 1 | 0 | 0 | 1 | 0 | 1 | 10 | 1 | 0 | 1 | 0 | 5 |
| 6 | 0 | 1 | 1 | 0 | 1 | 0 | 0 | 1 | 9 | 0 | 1 | 1 | 0 | 6 |
| 7 | 1 | 1 | 1 | 0 | 0 | 0 | 0 | 1 | 8 | 1 | 1 | 1 | 0 | 7 |
| 8 | 0 | 0 | 0 | 1 | 1 | 1 | 1 | 0 | 7 | 0 | 0 | 0 | 1 | 8 |
| 9 | 1 | 0 | 0 | 1 | 0 | 1 | 1 | 0 | 6 | 1 | 0 | 0 | 1 | 9 |

FIG. 8B (702 = LOGIC 0)

| | FFI-4 | | | | | READ OUT | | | | |
|---|---|---|---|---|---|---|---|---|---|---|
| | | | | | | A1 | A2 | A3 | A4 | |
| PULSE | Q1 | Q2 | Q3 | Q4 | DIGIT | $\overline{Q1}$ | $\overline{Q2}$ | $\overline{Q3}$ | $\overline{Q4}$ | $\overline{DIGIT}$ |
| 1 | 0 | 1 | 1 | 0 | 6 | 1 | 0 | 0 | 1 | 9 |
| 2 | 1 | 1 | 1 | 0 | 7 | 0 | 0 | 0 | 1 | 8 |
| 3 | 0 | 0 | 0 | 1 | 8 | 1 | 1 | 1 | 0 | 7 |
| 4 | 1 | 0 | 0 | 1 | 9 | 0 | 1 | 1 | 0 | 6 |
| 5 | 0 | 1 | 0 | 1 | 10 | 1 | 0 | 1 | 0 | 5 |
| 6 | 1 | 1 | 0 | 1 | 11 | 0 | 0 | 1 | 0 | 4 |
| 7 | 0 | 0 | 1 | 1 | 12 | 1 | 1 | 0 | 0 | 3 |
| 8 | 1 | 0 | 1 | 1 | 13 | 0 | 1 | 0 | 0 | 2 |
| 9 | 0 | 1 | 1 | 1 | 14 | 1 | 0 | 0 | 0 | 1 |
| 10 | 1 | 1 | 1 | 1 | 15 | 0 | 0 | 0 | 0 | 0 |
| 11 | 0 → 0 | 0 → 1 | 0 → 1 | 0 → 0 | 0 → 6 | 1 | 0 | 0 | 1 | 9 |

DIGITAL COUNTER AND TIMER WITH MULTIPLEX SETTING AND READOUT

This invention relates to the art of digital counters and more particularly to a digital counter which can be used as a timer and having multiplexed setting and readout.

The invention is particularly applicable for use as a timer or counter using a MOSFET integrated circuit containing the actual binary counters and it will be described with reference thereto; however, it is understood that the invention has much broader applications and may be used in a digital counter having other binary counter structures.

Digital counters are used in various applications. These counters generally employ a plurality of binary counters connected in cascade from the least significant digit to the most significant digit. An incoming pulsing signal is then counted and displayed in decimal numbers corresponding to the internal condition of each binary counter within the cascade arrangement. The binary counters generally include a series of flip-flop units which individually count up or down in a binary coded manner. With the advent of field effect transistors (FET), these binary counters can be constructed in relatively small integrated circuits in the form of chips having a plurality of input leads and output leads. Efforts have been made to adapt the relatively small field effect transistor, integrated circuits to a timer or counter which is sufficiently compact and inexpensive to be used in the industrial counting and timing field. These efforts have not been successful because of the substantial number of circuits necessary to control the various binary counter stages, for setting the proper codes in the binary stages and for providing decimal read-outs of the binary counters. The integrated circuits using FETs have only a limited number of terminals which will not accommodate the necessary external circuits and accessories needed in a timer or counter.

The present invention relates to an improvement in a binary counter employing a MOSFET integrated circuit which improvement relates to the multiplexing of the external circuit for setting the binary counter stages and multiplexing the external circuits for readout. The multiplexing is accomplished by an internal circuit which can be incorporated into the MOSFET integrated circuit itself without substantial external circuitry.

In accordance with the invention, there is provided a digital counter for counting down from a selected first and second decimal digit wherein the first digit is the lesser significant and the second digit is the more significant. This counter includes first and second binary down counters connected in cascade and means for setting the first selected digit in the first counter and the second selected digit in the second counter. Means are provided for applying a pulsing input signal to the first counter causing the first and second counters to count down from their original set conditions. A first group of leads is connected to the first counter means and carries a binary logic corresponding to the digit of the first counter at any given time. A second group of leads is connected to the second counter and carries a binary logic corresponding to the digit of the second counter at any given time. First and second readout means are provided with individual energizing leads and a circuit for accepting a binary code when the energizing means are energized. The invention also includes means for creating a succession of first and second signals, means responsive to the creation of the first signal for connecting the first group of leads from the first binary counter to both readout means and for simultaneously energizing only the energizing lead of the first read-out means, and means responsive to the creation of the second signal for connecting the second group of leads from the second binary counter and for simultaneously energizing only the energized lead of the second read-out means. In this manner, the decimal digit displayed in the first and second readout means corresponds to the particular binary coded digit existing within the first and second binary counters as they count down from the set condition. By using this invention, only one group of leads extend from the two binary counters to the readout unit. This substantially reduces the operating leads and allows use of a MOSFET integrated circuit having limited connecting terminals for the binary counters and the above-mentioned first and second groups of leads.

Of course, it is normal practice to provide at least four binary counters within the unit to display four separate decimal digits. In that case, the four binary counters are arranged in a cascade manner from least significant to most significant digits. Since the present application relates to a counter or timer, the binary counters within the unit are essentially down counters; however, as is well known in the art, a binary down counter can be provided by taking the output of the inverse terminals from a normal binary up counter. The use of the term down counter in the above description and throughout the application is to convey the concept that the digits in each of the separate binary counters are set within the binary counters and as pulses are introduced therein the counters count down from the set condition. This is used for timing out a set interval or measuring when a given number of pulses has been introduced into the digital counter unit.

In accordance with normal practice, when a plurality of binary down counters are connected in cascade, the least significant digit counter counts down from its set condition to zero. Thereafter, this least significant digit counter rolls over to a binary condition representing the digit 9 and again counts down to zero. When the least significant digit counter reaches each zero count, the next higher significant digit counter counts down by a single digit. This process is cascaded through the various binary counters until all counters have reached a zero count condition. This represents a selected timed duration when the counter is used as a timer or a particular number of input pulses when the counter is used to count. When all binary counters in the cascade arrangement reach a zero count, the digital counter then actuates an output circuit for controlling external devices. The preferred embodiment of the present invention utilizes this arrangement of cascaded binary counters; however, other arrangements could be adopted without departing from the intended spirit and scope of the invention.

In accordance with another aspect of the present invention there is provided a digital counter adapted to count down from a decimal number having at least two selected digits with the first digit being the less significant and the second being the more significant. This digital counter includes first and second binary down counters connected in cascade with means for setting the selected digits into the respective down counters, first input means having a first energizing lead and a plurality of separate circuits adapted to be binary coded in accordance with the less significant digit, and a second input means having a second energizing lead, a plurality of separate circuits adapted to be binary coded in accordance with the more significant digit. The above-mentioned circuits are connected to a common group of setting leads whereby the group of setting leads receives the set binary code of one of the first and second input means and wherein the common group of setting leads is connected to the setting means of both binary counters. In accordance with this aspect of the invention, there is provided means for creating a first and second signal in succession and means responsive to the creation of the first signal for energizing the first energizing lead and for simultaneously blocking the setting means of the more significant digit counter and means responsive to the creation of the second signal for energizing the second energizing lead and for simultaneously blocking the setting means of the less significant digit counter whereby after creation of the first and second signal, each of the binary counters is set with the selected digit preparatory to down counting as described above. In this manner, a single group of incoming leads can be used for setting the binary code of the binary down counters to the corresponding decimal digits. The succession of first and second signals can be repeated without changing the setting of the binary counters.

In accordance with a more limited concept of this aspect of the invention, there is provided means for blocking both setting means of the respective binary counters after the proper codes have been set therein and preparatory to the actual counting operation of the binary counters.

The primary object of the present invention is a provision of a digital counter, which counter employs a MOSFET integrated circuit and reduces the number of external leads without reducing the functions of the counter. As is well known, a MOSFET integrated circuit has only a limited number of terminals for interconnecting the internal circuitry with external circuitry. Consequently, the provision of a counter which reduces a number of leads which must be directed into and out of the MOSFET integrated circuit adapts this type of compact relatively inexpensive integrated circuit to economical use in a complex mechanism, such as a digital counter.

Another object of the present invention is the provision of a digital counter, which digital counter has an improved multiplexing of the decimal readout function thereof.

Another object of the present invention is the provision of a digital counter, which digital counter includes improved multiplexing of the setting function for setting the counter to the desired level preparatory to counting.

These and other objects and advantages will become apparent from the following description taken in connection with the accompanying drawings in which:

FIG. 3 is a truth table for the decoder used in the preferred embodiment of the invention;

FIG. 4 is a truth table for one latch employed in the preferred embodiment of the present invention;

FIGS. 5A–5C are enlarged schematic views illustrating operating characteristics of one component of a preferred embodiment shown in FIG. 2;

FIG. 8A is a truth table showing operating characteristics of the logic circuit of FIG. 8; and, FIG. 8B is a truth table showing additional operating characteristics of the logic circuit of FIG. 8.

Figure 1:
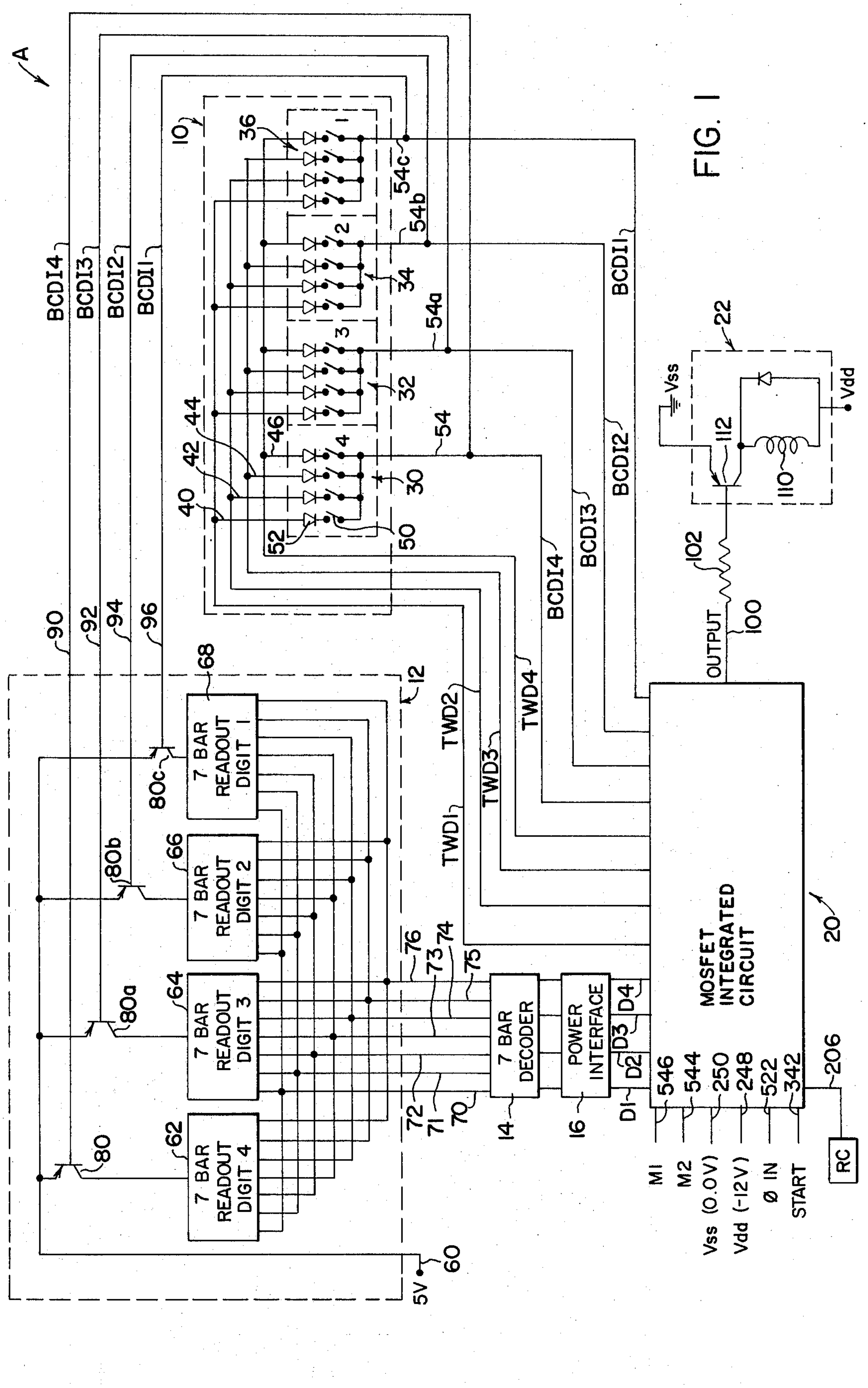
FIG. 1 is a schematic, combined wiring and block diagram illustrating the general arrangement of the preferred embodiment of the invention.

Referring now to the drawings, wherein the showings are for the purpose of illustrating a preferred embodiment of the invention only and not for the purpose of limiting same, FIG. 1 shows in schematic form, a digital counter unit A constructed in accordance with the present invention. Although any number of digits could be employed in practicing the invention, in accordance with the preferred embodiment of the invention, four decimal digits are counted by digital counter unit A. The counter A includes, as primary components, a manually actuated setting device 10, a decimal readout unit 12 including a 7-Bar decoder 14 and a power interface 16, a MOSFET integrated circuit 20 and an output circuit 22. The counting function of the counter is performed in the MOSFET integrated circuit 20, which is shown in more detail in FIG. 2 and will be described later. The desired or selected count to which the counter is to be set, which may be a time when the counter is used in a timing mode, is manually placed into setting device 10 for transmission to the interior of the integrated circuit 20. During the counting function, the decimal readout unit 12 displays the remaining time or count remaining in the counter at any given time. Consequently, by viewing the decimal readout unit 12, an operator can visually determine the remaining portion of the cycle of the counter. Before the timing or counting function begins, this readout displays the time or count set into the setting device 10. After the counter has timed out and the readout device reads zero, an output signal is supplied to the output circuit 22 for actuating external devices which do not form a part of the present invention and the readout unit 12 again displays the decimal digits set into device 10.

Referring now more particularly to the manually actuated setting device 10, it includes individual digit coding units 30, 32, 34, and 36 corresponding to the decimal digits of the desired cycle time or desired counts. Since these digit coding units are substantially identical, only unit 30 will be described in detail in this description and will apply equally to the other units. Parallel circuits 40, 42, 44 and 46 are connected to a common group of setting leads TWD1, TWD2, TWD3, and TWD4, and each parallel circuit includes a manually toggled switch 50 and a diode 52. The switches 50, when closed, present a first binary logic within the individual parallel circuit and, when opened, present the opposite binary logic. By closing particular switches 50 within unit 30, the parallel circuits exhibit a binary coded logic pattern which corresponds to the decimal digit of unit 30, in this case the fourth or most significant digit of the decimal number set into the device 10. In like manner, the other coding units 32, 34 and 36 include switches which can be manually set to correspond with the respective digits of a selected decimal number. In each case, the parallel circuits are connected to the same group of setting leads including leads TWD1, TWD2, TWD3 and TWD4. So that these setting leads do not receive the logic pattern set into all of the digit coding units, each coding unit includes an energizing lead, i.e., lead 54 of unit 30 and leads 54*a*, 54*b* and 54*c* of units 32, 34, 36, respectively. These energizing leads are connected as shown to selected leads in a group of multiplexing leads BCDI1, BCDI2, BCDI3 and BCDI4. Consequently, when a signal appears in multiplexing lead BCDI4, energizing lead 54 is energized so that the logic pattern within coding unit 30 is applied to the setting leads TWD1, TWD2, TWD3 and TWD4. The same is true as a signal appears in the remaining multiplexing leads. It can be seen that by scanning the multiplexing leads with signals, i.e., by creating signals in these successive leads, the setting leads receive each of the individual logic patterns set into the digit coding units of the manually actuated setting device 10. Although not forming a part of this invention, in practice the digit coding units are controlled by a rotatable thumb wheel having ten separate positions each of which closes a different pattern of switches 50 in the separate coding units.

Referring now to the decimal readout unit 12, a five volt power supply 60 is used to energize this unit which includes a digital display for each digit of the digital counter unit A. Since four digits are used in the preferred embodiment, four digit display units 62, 64, 66 and 68 are illustrated. These digit display units may take a variety of forms; however, in accordance with the preferred embodiment of the invention, the display units are 7-Bar units of standard design employing light emitting diodes LEDs. Since each display unit is substantially the same, only unit 62 will be described in detail and this description will apply equally to the other units. To control the seven bars within the 7-Bar display unit 62, there is provided seven input leads 70–76, which are connected to the output of the 7-Bar decoder 14. It is noted that the input leads are common to the four separate digit display units 62–68 so that at any given time each of the display units receives the same input from the decoder 14. If the display units were continuously energized, the signals in lines 70–76 would set all units to the same condition, which would be unintelligible. Consequently, in accordance with the invention, the multiplexing leads BCDI1–4 are used to control the separate display units 62–68. An energizing switch 80 controls the operation of unit 62. When a signal is received within multiplexing lead BCDI4, switch 80 is conductive. In this arrangement, when the output of decoder 14 corresponds to the decimal digit within the fourth digit of the counter, using an arrangement to be described later, switch 80 is energized by a signal from lead BCDI4. This causes only the unit 62 to read the pattern within leads 70–76.

Energizing switches 80*a*, 80*b*, and 80*c* of units 64, 66 and 68 respectively, operate in the same manner as energizing switch 80. The separate switches are controlled by energizing leads 90, 92, 94 and 96, respectively, which are connected to the multiplexing leads, as shown. The decoder 14 receives binary coded logic from a power interface 16 which increases the power of binary logic within readout leads D1, D2, D3 and D4. The binary logic within these four leads is cycled, as will be explained later, between the internal counter stages corresponding to the first, second, third and fourth digits as counter unit A counts down. When the leads D1–D4 have the binary logic corresponding to the first digit, energizing lead 96 receives a signal so that the binary logic which is decoded by decoder 14 is applied to unit 68, the only display unit energized, to display the first digit in this unit. The cycling from digit to digit by successive signals in multiplexing leads BCD1–4 takes place at a rate as high as approximately 200,000 cycles per second so that all units 62–68 read the current value of the four digits within the internal counter.

After the counter unit A has reached the zero count, indicating a timing out when used in a timing mode or the existence of a preset number of counts when used in a counting mode, a signal is applied to the output circuit 22 through line 100 and resistor 102. When a signal is applied to the output circuit, various arrangements could be used for actuating a desired external device; however, in accordance with the illustrated embodiment of the invention, relay coil 110 is energized by a switching transistor 112 connected between 12 volt supply $V_{DD}$ and a ground potential $V_{SS}$.

Figure 2A:
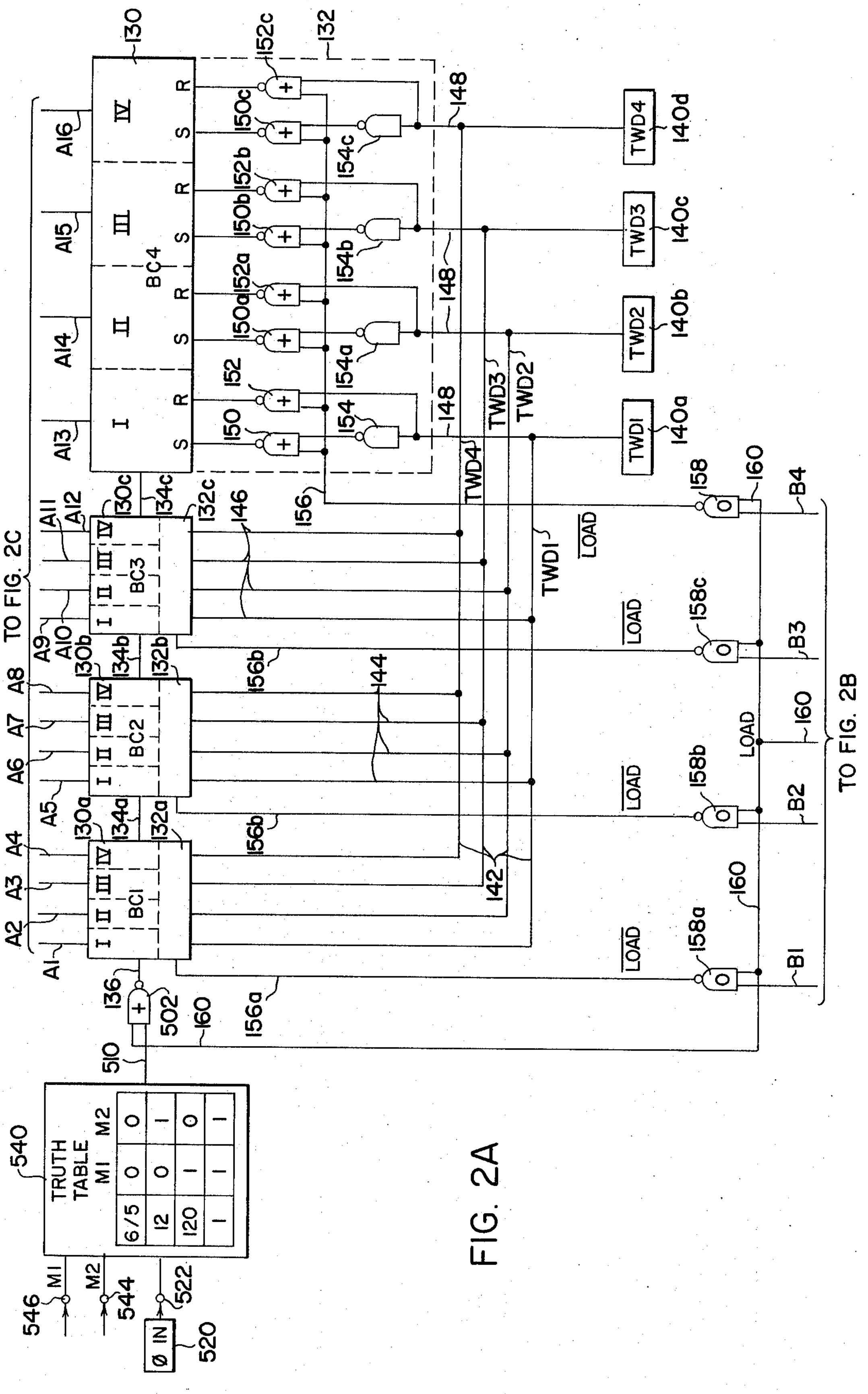
FIG. 2 is a three part schematic logic diagram illustrating the internal function of one component shown in FIG. 1 with the parts designated FIGS. 2A, 2B and 2C.
Figure 2B:
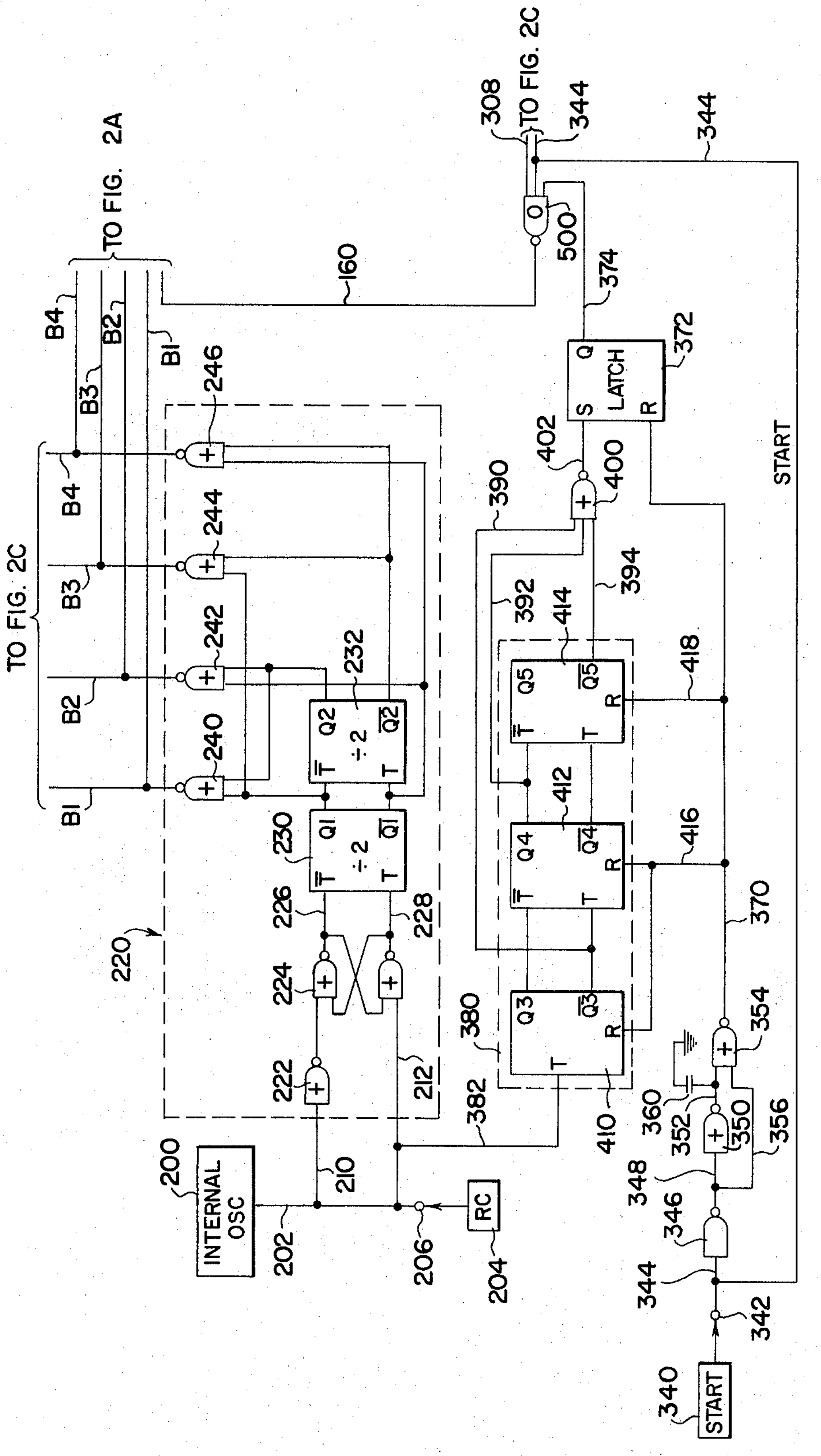
Figure 2C:
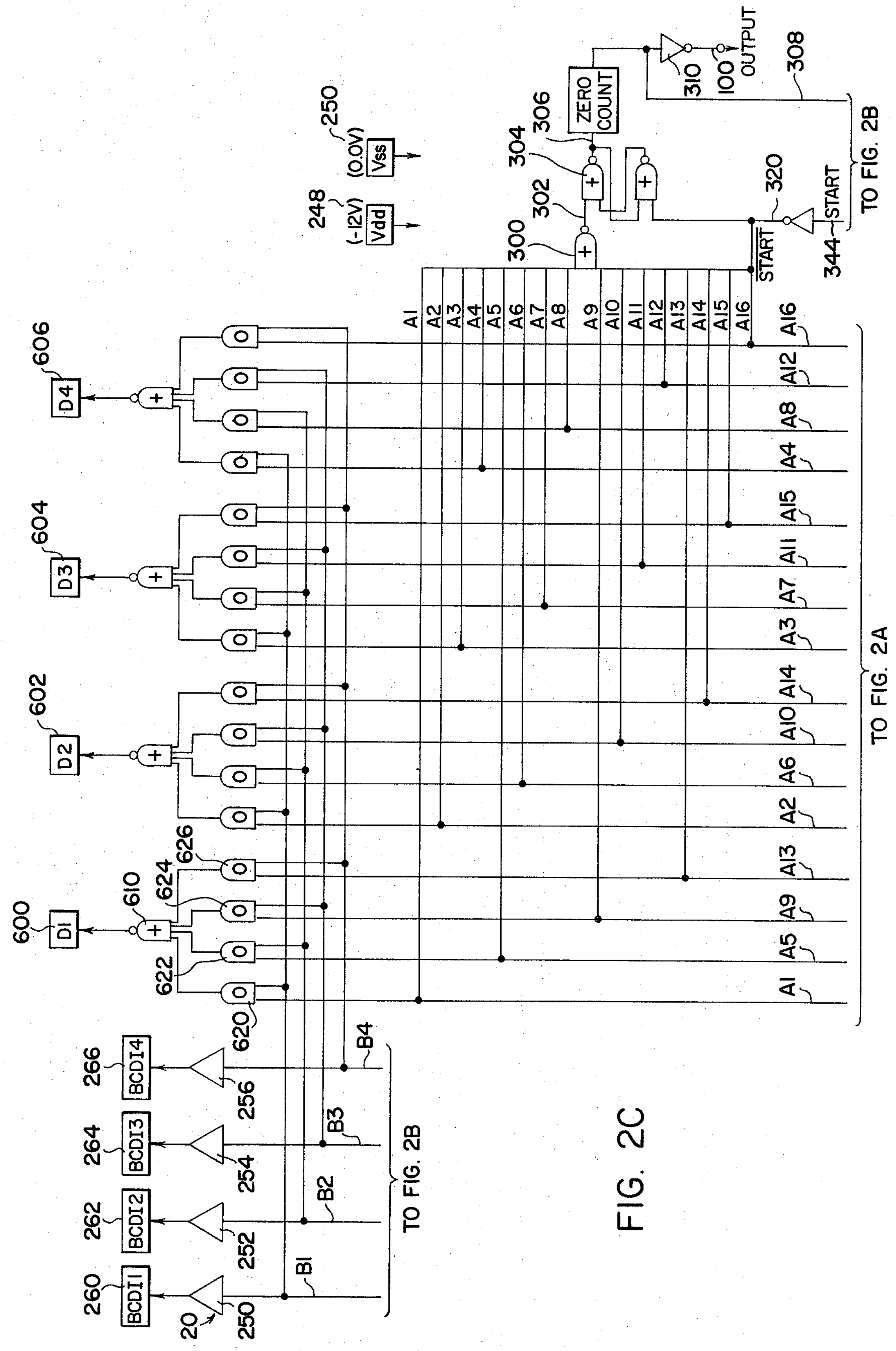

The above description, which illustrates the general operation of unit A, applies basically to the circuitry external of the MOSFET integrated circuit 20 and a complete understanding of this external circuitry requires a description of the general logic network contained within the integrated circuit 20, which is shown schematically in FIG. 2. For simplicity FIG. 2 is divided into four separate views, i.e., FIGS. 2A, 2B and 2C, which should be considered simultaneously.

BINARY COUNTERS

In accordance with the preferred embodiment of the present invention as shown in FIG. 2, there is provided within the MOSFET integrated circuit four separate binary counters BC1, BC2, BC3 and BC4 arranged in cascade fashion from the least significant digit counter BC1 to the most significant digit counter BC4. Each of these counters is adapted to count down from an internally set binary code representing a decimal digit set into the manually actuated setting device 10. Since each of the binary counters is substantially the same, binary counter BC4 will be described in detail and this description will apply equally to the other binary counters. Binary counter BC4 is divided into two sections, counting circuits 130 and setting means or circuits 132, shown enclosed in dashed line. The corresponding components of the other binary counters are designated 130*a*, 130*b*, 130*c* and 132*a*, 132*b*, 132*c*, respectively. For simplicity, details of the setting means or circuits for the remaining three binary counters have been omitted.

The binary counter BC4 is divided into four separate stages I, II, III, and IV each of which includes a flip-flop circuit of normal construction used in binary counters and having a set terminal S and a reset terminal R. These four stages are adapted to be set to logic 1 or be reset to logic 0 in accordance with the logic pattern established in one of the digit coding units 30, 32, 34 and 36 of the manually actuated setting device 10 in FIG. 1. Consequently, the stages of the respective binary counters are originally set to the manually adjusted logic code or pattern which corresponds to a selected decimal number representing a time interval when a timing mode is used or a selected number of pulses or counts to be made when a counting mode is used.

The four binary counters are connected in cascade by toggle lines 134*a*, 134*b* and 134*c* in accordance with common binary counting technology. After the least significant counter BC1 reaches a zero count, a toggle pulse is directed through line 134*a* to the next significant counter BC2. This down counts counter BC2 by one. BC1 then rolls over to a binary code representing the digit 9 and continues to count down as it receives incoming pulses through an input line 136. Upon the next zero count of counter BC1, another toggle pulse is directed to counter BC2. When BC2 receives a sufficient number of toggle pulses to count down to a zero count, counter BC2 provides a toggle pulse in lines 134*b* which counts down counter BC3 by one. This process continues until all four binary counters have reached a zero count. At this time, an output signal is directed through line 100 in a manner which will be described in more detail later.

The setting function of the binary counters is controlled by input setting leads TWD1, TWD2, TWD3 and TWD4 connected on terminals 140*a*, 140*b*, 140*c*, 140*d*, respectively. These terminals are output terminals for the integrated circuit shown in FIG. 2. The setting leads TWD1-4 are connected to separate groups of input lads 142, 144, 146 and 148, respectively, for the four binary counters BC1, BC2, BC3 and BC4. Consequently, at a given time all counters are receiving the particular logic pattern then appearing in the setting leads TWD1-4 which corresponds with a particular logic pattern within one of the digit coding units 30, 32, 34 and 36. As will be explained in the next section, the multiplexing of all logic patterns to each of the binary counters does not cause erroneous setting of the counters due to the unique setting means or circuits 132.

SETTING MEANS FOR BINARY COUNTERS

Figure 6:
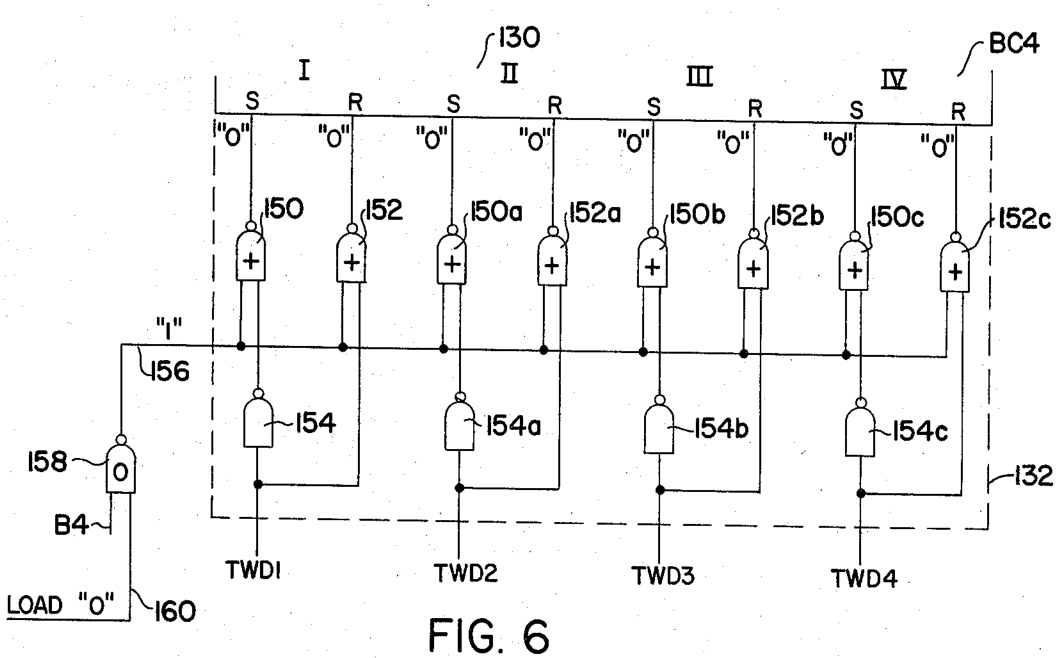
FIG. 6 is an enlarged view showing a certain operating characteristic of another component illustrated in FIG. 2.

Referring now to the setting means or circuits 132 for the binary counters, each stage within the counters includes a set NOR gate 150 and a reset NOR gate 152. When a logic 1 is applied to the counter stage by NOR gate 150, that stage is set to logic 1. When a logic 1 is applied to the counter stage by NOR gate 152, that stage of the binary counter is reset to logic 0. Consequently, by applying a particular logic to the respective NOR gates 150, 152 the internal counter stages of the binary counter are set with a binary code. The NOR gate 150 has a first input connected to the output of an inverter 154 and a second input connected to a line or blocking lead 156. When a logic 1 appears in either of these lines, a logic 0 is directed to the set terminal S of stage I in binary counter BC4. When a logic 0 is applied to both input terminals of NOR gate 150, a logic 1 is applied to the set terminal S of stage 1 and sets the stage to logic 1. NOR gate 152 has a first input connected to line or blocking 156 and a second input connected to the input side of inverter 154. NOR gate 152 operates similar to NOR gate 150 except a logic 1 input resets stage I to logic 0. Each of the other stages II, III, and IV includes similar input setting circuits with the NOR gate and inverters having respectively, the subscripts *a*, *b*, and *c*. Blocking lead 156 is a blocking means for the setting circuits and is controlled by a NAND gate 158 having a first input B4 which corresponds substantially to multiplexing control lead BCDI4. When line B4 and line 160 each carry a logic 1, a logic 0 appears in blocking lead 156 to unlatch the four circuits for setting the binary counter BC4. When either input to the NAND gate 158 is logic 0, the blocking lead 156 receives a logic 1 which blocks all of the setting circuits. This then allows the counter BC4 to count down upon receiving successive pulses without being influenced by the setting leads TWD1-4. This last addition is schematically illustrated in FIG. 6 when a logic 1 is shown in line 156 and a logic 0 is exhibited at the output leads of the NOR gates in the setting means or circuits.

During the setting operation for the various binary counters, the setting leads TWD1-4 successively include the selected logic to be set into the individual binary counters BC1-4. The operation for setting counter BC4 will apply equally to the other counters. When multiplexing BCDI4 is energized, the logic of digit coding unit 30 is transferred through setting leads TWD1-4 to the input side of all binary counters BC1-4. However, of the control leads or lines B1, B2, B3 and B4, only line B4 receives a logic 1 or another energizing signal when line BCDI-1 is energized. Consequently, only NAND gate 158 is energized to present a logic 0 to blocking lead 156. Of course, line 160 must at this time be receiving a logic 1 which is the case while the binary counters are being set. The control of line 160 will be described in detail later. With the logic 0 in lead 156 of binary counter BC4, a logic 1 appearing in one of the setting leads, such as TDW1 will provide a logic 1 at the input of in-verter 154 and logic 0 at the output of the inverter. This applies a logic 0 to both inputs of NOR gate 150 and a logic 1 appears at its output. Consequently, stage I counter BC4 is set to logic 1. At the same time, since the input to inverter 154 is logic 1, one input to the NOR gate 152 is logic 1. This produces a logic 0 output for the NOR gate 152 and precludes resetting of stage I. It is seen that a logic 1 appearing at setting lead TWD1 sets the stage I to logic 1. Now assume that logic 0 appears in setting lead TWD1. In this situation, the input to inverter 154 is logic 0 and the output is logic 1. This causes a logic 1 at one input of NOR gate 150. Consequently, the output of NOR gate 150 is logic 0. Stage I is not set to logic 1. Referring now to NOR gate 152, in this situation, both inputs to this NOR gate are logic 0; therefore, the output is logic 1 and stage I of the binary counter is reset to logic 0. Consequently, when logic 0 appears in setting lead TWD1, stage I is reset to logic 0. This procedure is followed for all stages in the binary counter BC4.

From the above description, as the setting leads TWD1-4 receive the particular logic pattern for setting into a particular binary counter, the control lead B1, B2, B3 or B4 for that particular counter is energized so that the blocking lead 156 unlatches the setting means and allows the manually adjusted logic pattern to be set within the stages of the binary counter. After all multiplexing leads BCDI1-4 have been scanned with the corresponding control leads B1-4 being scanned, all four binary counters BC1-4 are internally set with a binary code corresponding to the selected four decimal digits manually adjusted into the setting device 10. The binary counters are now in condition for counting with the application of pulses in input lead 136. When the counting or timing operation is ready to commence, the logic 0 is created within line 160, see FIG. 6, which latches blocking lead 156 to a logic 1. This produces logic 0 at all outputs of the NOR gates as indicated in FIG. 6. In this condition, irrespective of a signal in the control line B4 there is no shifting of the logic within lead 156 and no further setting of the internal circuits within counter BC4.

SCANNING

As so far explained, the multiplexing of the logic patterns to the respective binary counters BC1-4 is controlled by correlating the existence of a signal within one of the multiplexing leads BCDI1-4 and its corresponding control lead B1-B4. In other words, when a signal exists within multiplexing lead BCDI1 and control lead B1, the logic pattern from digit coding unit 36 of manually actuated setting device 10 is applied into the counter **130*a* of binary counter BC1, assuming that the setting circuits or setting means 132*a* is not receiving a blocking logic 1 in blocking lead 156*a*. The other binary counters are set successively as the various multiplexing leads and control leads are energized in unison. Consequently, it is necessary to provide a succession of signals for energizing separately and successively the following pairs of leads: B1-BCDI1, B2-BCDI2, B3-BCDI3, and B4-BCDI4. The creation of a successive signal for energizing the successive pairs of leads mentioned above is accomplished, in accordance with the illustrated embodiment of the present invention, by employing an internal oscillator 200 having internal circuitry to produce oscillations within output 202. In accordance with the preferred embodiment of the invention, the oscillator oscillates at a frequency within the range of 20,000 cycles to 200,000 cycles. To control the frequency within this range, there is provided an external RC control circuit 204 connected onto the MOSFET circuit by terminal 206. Output 202 is directed to dual input leads 210, 212 to a decoder 220 which may take a variety of structural forms. In accordance with the preferred embodiment of the invention, the decoder 220 includes an inverter 222 in lead 210 and a conventional flip-flop circuit 224 having inverted output leads 226, 228. When logic 1 appears in lines 210 and 212, inverter 222 applies a logic 0 to the flip-flop. A logic 1 then appears in lead 226 and a logic 0 appears in lead 228. When a logic 0 appears in leads 210, 212 the output in leads 226, 228 are reversed by the flip-flop 224. Leads 226 and 228 are connected to the $\overline{T}$ and the T terminal of a T-type flip-flop 230 having outputs Q1 and $\overline{Q1}$. These outputs are connected to similar inputs of a second T-type flip-flop 232 having outputs Q2 and $\overline{Q2}$. Decoder 220 also includes NOR gates 240, 242, 244 and 246 which are connected as shown in FIG. 2 to various outputs of the flip-flops 230, 232. Being more specific, NOR gate 240 has inputs $\overline{Q1}$, Q2 and an output which is B1. NOR gate 242 has inputs Q1, $\overline{Q2}$ and an output which is B2. NOR gate 244 has inputs $\overline{Q1}$, $\overline{Q2}$ and an output which is B3. NOR gate 246** has inputs Q1, Q2 and an output which is B4.

Referring now to FIG. 3, a truth table for decoder 220 is set forth. The left hand column indicates input pulses from oscillator 200. It is noted that as pulses are applied to the decoder 220 through leads 210, 212 the NOR gates 240, 242, 244 and 246 successively have outputs of logic 1. The oscillator runs continuously as long as power is applied to the unit A by connecting a terminal 248 to −12 volts and grounding terminal 250; therefore, during the operation there is a signal being created within leads B1, B2, B3 and B4 repeatedly and in order. The frequency of this scanning cycle through the leads B1–B4 is determined by the oscillator 200. Consequently, in the preferred embodiment of the invention this cycling or stepping from one output cycle to the other takes place at a frequency of at least 20,000 cycles per second.

Control leads B1–B4 are connected through power boosting interface devices 250, 252, 254, 256, respectively, to terminals 260, 262, 264, and 266 on the MOSFET integrated circuit. As indicated, these terminals are respectively connected to the multiplexing leads BCDI1-4 for use in the external circuits as illustrated and described in connection with the disclosure of FIG. 1.

BINARY COUNTER OUTPUT

As previously mentioned, lines A1–A16 are connected to the internal stages of the respective binary counters BC1-4. These counters count down from the set digits and produce an output at line 100 when all counters have reached a zero count. A variety of structures could be used for reading a zero count in leads A1–A16; however, in accordance with the illustrated embodiment of the invention, a NOR gate 300 is provided with all leads A1–A16 used as control inputs. Output 302 of NOR gate 300 is connected to a standard flip-flop 304 having an output 306, which receives a logic 0 when a zero count is registered in the four binary counters. The logic within line 306 is directed to line 308 for a purpose to be explained later. Inverter powerface 310 inverts the zero count logic 0 into a logic 1 and amplifies the same for output through lead 100 to the external load 22, shown in FIG. 1.

Lead 320 is designated as the $\overline{START}$ lead and is directed to the input of NOR gate 300 and to the second input of flip-flop 304. Lead 320 sets the flip-flop 304 to a logic 1 output when the digital counter A has not been started. At that time, the START logic is logic 0 and the $\overline{START}$ logic is logic 1. With logic 1 in line 320, a logic 1 appears at output 306 irrespective of the logic in line A1–A16. When the digital counter A is started in a manner to be described, a logic 1 is applied at the starting terminal. A logic 0 then appears in $\overline{START}$ line 320. This allows a NOR gate 300 and a flip-flop 304 to be controlled by the terminals A1–A16 and the previously set logic 1 remains in line 306 until all leads A1–A16 receive a logic 0 which occurs at zero count for all binary counters. When this happens, the logic 1 appears in the lead 302 which is the reset lead for the flip-flop 304 and this logic 1 resets the flip-flop to a logic 0 output and provides an output in line 100. This completes a description of the output for the binary counters BC1–BC4.

STARTING CIRCUIT

To start the counting function of the digital counter A, there is provided an appropriate external source 340 of starting logic connected to the integrated circuit 20 by terminal 342. In accordance with the preferred embodiment of the invention, the starting logic source 340 creates a logic 0 when in the OFF position and a logic 1 when in the ON position. This logic is introduced through lead 344 to inverter 346 having an output 348. NOR gate 350 has a single input which is output 348 of inverter 346 and an output 352 connected to one input of NOR gate 354. This NOR gate has a second input 356 taken from the input side of NOR gate 350. A capacitor 360 is connected from lead 352 to ground potential. The output of the starting circuit is directed through lead 370 to the R terminal of a flip-flop latch 372. The output of this latch is at lead 374 which receives a logic 0 when a logic 1 is introduced into the reset terminal R by lead 370. The setting terminal S of latch 372 is controlled by a three stage binary counter 380 of somewhat standard construction. This counter includes an input 382 connected onto input lead 212 of decoder 220. Binary counter 380 includes three outputs, i.e., 390 connected to $\overline{Q3}$, 392 connected to Q4 and 394 connected to $\overline{Q5}$. These output terminals direct the logic from counter 380 to a S terminal of latch 372. The three internal flip-flops 410, 412 and 414 of the three stage binary counter 380 are reset to a logic 0 when logic 1 is directed through reset leads 416, 418 from start output line 370.

Figure 5C:
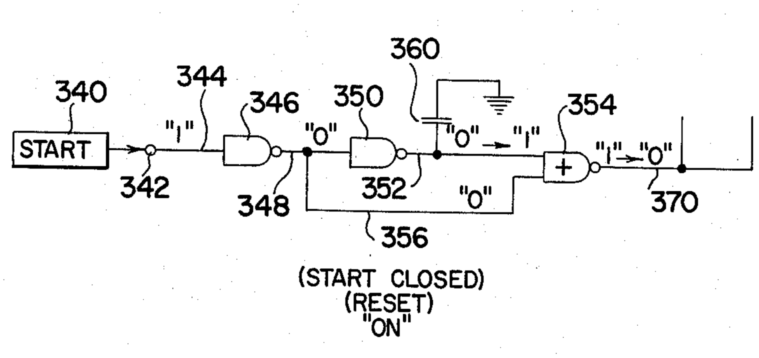

The operation of the starting circuit for the digital counter can best be understood by initial consideration of the operating characteristics illustrated schematically in FIGS. 5A, 5B and 5C. Referring now to FIG. 5A, during the steady state counting condition a logic 1 START logic appears in line 344. This causes, in the steady state condition, a logic 1 to appear in output lead 352. Consequently, a logic 0 appears in lead 370. This logic 0 cannot reset the flip-flops 410, 412, 414 or the latch 372. FIG. 5B shows the operating characteristics of the circuit shown in FIG. 5A when the START logic source 340 has been shifted to the OFF position and a logic 0 appears in line 344. This produces a logic 1 in output lead 348 which logic is directed through input lead 356 to the NOR gate 354. Consequently, the output within lead 370 remains at logic 0 as was the case in FIG. 5A. During this condition, capacitor 360 maintains a logic 1 within lead 352 for a short period. Thereafter, the lead goes to logic 0; however, NOR gate 354 has been latched by a logic 1 in lead 356, and variations within lead 352 have no effect thereon. This is not true with the START logic source 340 is then again turned ON to start the timing or counting function of the digital counter A. In that situation, as shown in FIG. 5C, a logic 1 appears in lead 344. This causes a logic 0 within input 356 of NOR gate 354. Consequently, this NOR gate is unlatched. Capacitor 360 maintains a logic 0 within lead 352 for a short duration. During this time, a logic 1 appears in line 370. This logic 1 resets flip-flops 410, 412, and 414 to logic 0 and resets latch 372 to logic 0. After this is done, the lead 352 shifts to the steady state condition having a logic 1. When this happens, a logic 0 again appears within line 370 and terminates the resetting operation of the START logic. Since latch 372 has been reset to logic 0, a logic 0 appears in line 374 which is connected together with start lead 344 and zero count lead 308 with a NAND gate 500 shown in FIG. 2 and forming a master control function in the digital counter A. As long as a logic 0 appears within line 374 NAND gate 500 is latched with a logic 1 output that is directed through lead 160 to the previously discussed NAND gates **158, 158*a*, 158*b* and 158*c*. This allows the control leads B1-4 to introduce the set logic into the various binary counters BC1-4. Consequently, as long as a logic 0 appears within line 374 the binary counters can be set to the desired digital representations. This brings into importance the function of the three stage binary counter 380. Since the preferred embodiment employs four separate binary counters within the integrated circuit 20 for performing the counting function, four oscillations from oscillator 200 must be present before all binary counters can be loaded. In other words, the four control leads B1-4 must be scanned, and this requires four oscillations or pulses from the internal oscillator. The binary counter 380 maintains a logic 0 within lead 374 for a time exceeding four oscillations of the oscillator during which time the logic 1 within line 160 allows setting of all counters. Line 160 is also connected to an input NOR gate 502, the output of which is the input lead 136 for the binary counters. With a logic 1 in lead 160 NOR gate 502 is latched and cannot introduce pulses into lead 136.**

Referring now more particularly to the operating characteristics of the three stage binary counter 380, reference is made to the truth table shown in FIG. 4. As the flip-flops 410, 412 and 414 count up after being reset to logic 0 the Q and $\overline{Q}$ terminals of the flip-flops have the binary logic represented in this truth table. The Boolean representation for the output of NOR gate 400, which appears in lead 402 is shown at the right of the truth table. It is noted that until the fifth oscillation or pulse is directed into the three stage binary counter 380, logic 0 appears within line 402 and latch 372 remains at logic 0. On the fifth pulse, a logic 1 appears in line 402 and latch output lead 374. This unlatches the control NAND gate 500. If a logic 1 appears in both lines 308 and 344, a logic 0 appears within lead 160 to unlatch input NOR gate 502 and latch NAND gates **158, 158*a*, 158*b* and 158*c*. Consequently, all of the setting circuits 132 of the binary counters are blocked and the counting function commences with pulses received by lead 136. In summary, the three stage binary counter 380 delays or blocks the operation of the binary counters BC1-4 for a time corresponding to five oscillations of the oscillator 200.** Thereafter, the setting means for the binary counters are blocked and the binary counters start their down counting functions.

OPERATION OF NAND GATE 500

Figure 7A:
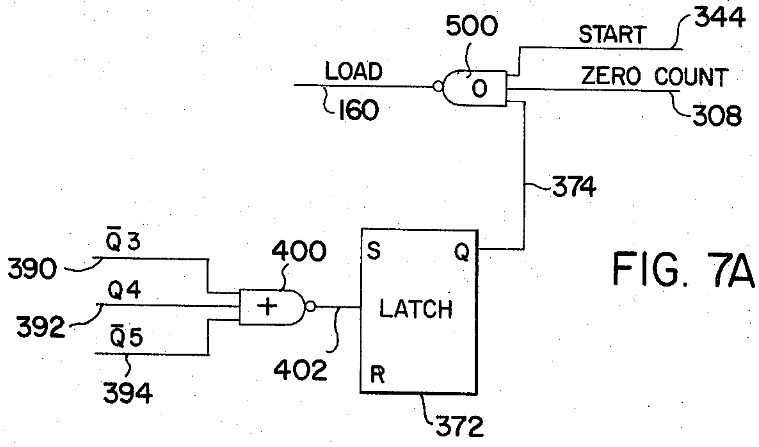
FIG. 7A is an enlarged view showing a portion of the diagram illustrated in FIG. 2.
Figures 7B, 8:
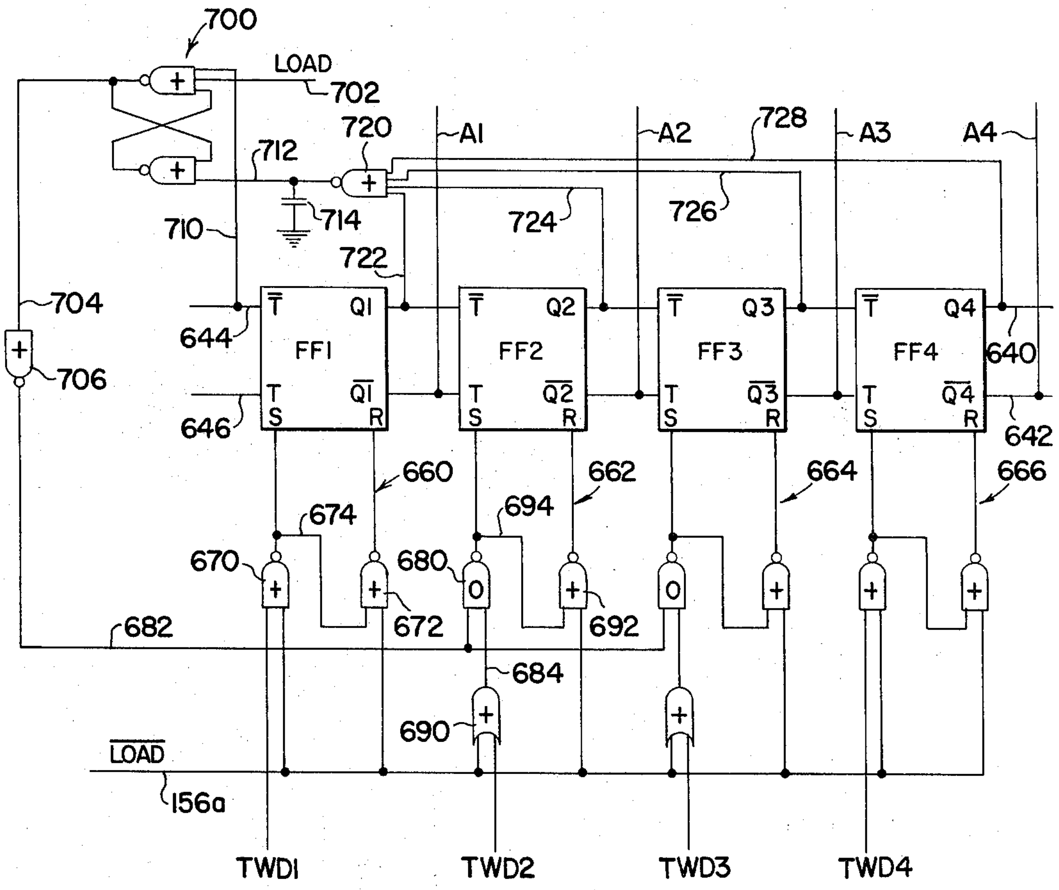
FIG. 7B is a truth table showing the operation of the components illustrated in FIG. 7A.
FIG. 8 is a somewhat modified showing of a certain aspect of the preferred embodiment illustrated in FIG. 2.

NAND gate 500 controls the loading or setting and counting functions of the binary counters BC1-4. FIG. 7A shows NAND gate 500 and its input control leads. FIG. 7B shows the truth table for the output in lead 160. When logic 0 is applied to start lead 344, lead 160 is latched to logic 1. This allows loading or setting of all binary counters with the logic patterns received through setting leads TWD1-4. Consequently, if the start logic is changed from logic 1 to logic 0 during a timing or counting function, the binary counters are reset to their original conditions. Referring now to zero count lead 308, when a zero count is registered in all binary counters a logic 0 appears in line 308. This also latches LOAD lead 160 to a logic 1 condition which again allows resetting of the binary counters. Consequently, it is possible to provide circuitry for having repeat timing after the binary counters have been reset to the selected digits by a logic 0 in lead 308. This can be done by again shifting the START logic to logic 0 and then to logic 1.

INPUT CIRCUIT

Input pulses are introduced through a line 510 to the NOR gate 502. Whenever the logic in line 160 is logic 0, the same number of pulses are introduced into lead 136 as appearing in lead 510. In accordance with the preferred embodiment of the present invention, the digital counter unit A can be operated in a timing mode or in a counting mode. Pulses are applied from a source 520 through an input terminal 522 which is located at one terminal or peg of integrated circuit 20. When in a counting mode, a clocking pulse is applied to the input terminal 522. For instance, a 120 cycle per second clocking pulse obtained by a full wave rectification of a 60 cycle per second signal is preferred. When a counting mode is to be used, pulses are applied at the terminal 522. To adjust the range of the four binary counters, there is provided a programmable divider 540 having internal circuitry within the integrated circuit itself and following the truth table 542 superimposed upon the divider. The truth table is set forth in accordance with the logic applied to M2, M1 terminals 544 and 546, respectively, of integrated circuits 20. By applying a logic 0 to both terminals, the divider divides the incoming pulses by 6/5. This gives 100 pulses per second so that the range of the timer is 00.01 to 99.99 seconds. By programming the terminals 544, 546 with the first having a logic 1 and the second having a logic 0, the programmable divider divides the incoming pulse from source 520 by 12. This gives 10 pulses per second and provides a range of 000.1 to 999.9 seconds. When the next setting of the divider is made the incoming pulses are divided by 120. This provides one pulse per second and a range of 0001 to 9999 seconds. In this particular mode, the second digit binary counter BC2 may reset and count down from 6 to 0 at every roll over. In this situation, the two least significant digits, i.e., BC1 and BC2 read in seconds while the two most significant digits BC3 and BC4 read in minutes. The range of the timer in this situation would be from 00 minutes and 01 seconds to 99 minutes and 99 seconds. This arrangement in binary counters is known in digital clocks reading in minutes and seconds.

In the counting mode, the terminals 544 and 546 are connected to logic 1. This allows a direct transfer through the divider 540 of each pulse from source 520. The structure of the programmable divider forms the subject of a copending patent application having a common assignee. It does not form a part of the invention hereof.

READOUT FUNCTION

As previously mentioned, the unit A may or may not have a readout function; however, in accordance with the preferred embodiment of the invention, the unit does incorporate a readout arrangement wherein the decimals within the individual binary counters BC1-4 are visually displayed on the digit display units 62–68 of readout unit 12, shown in FIG. 1. The digit display units are controlled by creation of signals within the four control leads B1-4 of the integrated circuit 20. As shown in FIG. 2, leads B1-4 are connected to terminals 600, 602, 604 and 606. At terminal 600 the binary condition of stage I of the four counters BC1-4 appears in succession as a signal is created in leads B1-4. Synchronized therewith the binary condition of stage II of the counters appears at terminal 602. The binary condition or code of stage III of the counters appears at terminal 604, and the binary code of stage IV of the counters appears at terminal 606. Since all the terminals are controlled by substantially the same circuitry, only the circuitry associated with terminals 600 will be described in detail and this description will apply equally to the other terminals.

Terminal 600 is connected to the output of NOR gate 610 having four inputs which are the outputs of AND gates 620, 622, 624 and 626. AND gate 620 has a first input controlled by control line B1 and a second input connected to line A1 which is the output line for stage I of counter BC1. In a like manner, AND gate 622 has a first input connected to control lead B2 and a second input connected to line A5 corresponding to stage I of binary counter BC2. AND gate 624 has a first input connected to control line B3 and a second input connected to the line A9 corresponding to stage I of counter BC3. Lastly, AND gate 626 has a first input connected to control line B4 and a second input connected to line A13 which corresponds to stage I of counter BC4. This arrangement of AND gates provides an obvious operation. When line B1 receives a logic 1 signal, terminal 600 reads the condition of stage I of counter BC1. At the same time, terminal 602 reads the output of line A2 which is the stage II of counter BC1, terminal 604 reads the condition of line A3 which is the stage III of counter BC1, and terminal 606 reads the condition of line A4 which is the stage IV of binary counter BC1. Consequently, when a signal appears at B1 the terminals 600, 602, 604 and 606 exhibit all four stages of counter BC1. These four stages are then directed through the power interface 16 and the seven-Bar decoder 14 and are applied to all digital display units 62, 64, 66 and 68. However, when line B1 is energized, only multiplexing lead BCDI1 is energized in the group of multiplexing leads containing leads BCDI1-4. This means that only digit display unit 68 is connected to the 5 volt power source 60 and receives the logic within lines 70–76. Thus, when B1 is created by the decoder 220, the digit binary coded into counter BC1 appears at display unit 68. In like manner, when control line B2 is energized, display unit 66 exhibits the digit corresponding to the binary condition of counter BC2. When B3 is energized, digit display unit 64 exhibits a digit corresponding to the binary condition of counter BC3. When line B4 is energized the display unit 62 exhibits a digit corresponding to the binary condition of counter BC4. Since the oscillator oscillates rapidly to scan between lines B1–B4, the digits displayed within the digital readout unit 12 are the current condition of the binary counters as they count down.

As previously mentioned, signals are scanned through lines B1–B4 continuously during the setting function and during the count down function; therefore, readout unit 12 displays the original selected decimal digits in each of the display units prior to the down counting function of the various counters BC1-4. This gives a convenient arrangement for adjusting the selected digits for the desired cycling of unit A. After the unit A has counted to zero, a logic 0 appears in line 308. This latches line 160 to a logic 1 which unlatches NAND gates 158, 158*a*, 158*b*, and 158*c*. Consequently, the original selected setting of the manually actuated setting device 10 is again applied to the binary counters BC1-4 and the readout reads the original setting. Thus, after zero count the readout device 12 automatically goes to the original set condition unless changes have been made in device 10 during the counting cycle. It is noted that such changes in the device 10 during the cycling of the unit does not affect the timing function; however, arrangements can be made to discontinue a timing function during its cycling.

BINARY DOWN COUNTERS

The term binary down counter as used in this application indicates the general function of the binary counters BC1-4 in that they perform the function by counting down from preselected digits set therein by the manually actuated setting device 10. Since most binary counters or counting circuits are up counters, in accordance with the concept of the present invention it is possible to provide these up counters with a down counting function primarily by using the inverse output terminal of the various flip-flop stages within a four stage binary up counter. This concept is illustrated in FIG. 8 which is intended to correspond to the least significant digit counter BC1 in FIG. 2. The description of the binary counter illustrated in FIG. 8 will show how the down counting function can be obtained in an up counter with the binary input code to the counter having standard decimal digit logic and the output code from the counter having standard decimal digit logic. Consequently, the readout unit of the setting unit can function to set the counter as if up counting function were to be performed. This allows the use of more standard auxiliary equipment for the binary counters BC1-4.

Referring now more particularly to FIG. 8 corresponding to counter BC1, the binary down counter includes four interconnected T-type flip-flops FF1, FF2, FF3 and FF4 terminating in output toggle lines 640, 642 and having an input line 644, 646. Each of the flip-flops has the standard terminals T, $\overline{T}$, Q, $\overline{Q}$, S and R. As input pulse is applied to lines 644, 646, the flip-flops count up in binary fashion corresponding to decimal numbers. Before explaining the function of these flip-flops, the circuitry shown in FIG. 8 should be considered.

The flip-flops FF1-4 have setting or loading circuits 660, 662, 664 and 666 connected to the S and R terminals of the respective flip-flops. As can be seen, the setting circuits 660, 666 are substantially identical; therefore, description of setting circuit 660 will be described, and this description will apply to the setting circuit 666. NOR gate 670 includes two inputs one connected to setting lead TWD1 and the other connected to blocking lead **156*a*. The output of this NOR gate is connected to the set terminal S of flip-flop FF1. A second NOR gate 672 includes the first input connected to the blocking lead 156*a* and a second input connected to lead 674 at the output of NOR gate 670. The output of NOR gate 672** is connected to the reset terminal R of flip-flop FF1.

The setting circuits 662, 664 are substantially identical. The description of setting circuit 662 will apply equally to both of these circuits. NAND gate 680 has a first input connected to a lead 682, a second input connected to a lead 684 and an output connected to the set terminal S of flip-flop FF2. OR gate 690 has a first input connected to blocking lead **156*a*, a second input connected to setting lead TWD2 and an output connected to lead 684. To complete the circuit, there is incorporated a NOR gate 692 having a first input connected to the blocking lead 156*a* and a second input connected to a lead 694 attached onto the output of NAND gate 680. Before explaining the operation of the setting circuits, it is necessary to also explain the other circuitry shown in FIG. 8**.

The binary counter includes a rollover control flip-flop 700 having a reset line 702 adapted to receive binary logic which is the logic of lead 160 which is generally the inverse of the logic in blocking lead **156*a*. Irrespective of other conditions, when a logic 1 is applied to lead 702, which occurs during the setting or blocking function of the counter and when a logic 0 is applied to blocking lead 156*a*, an output 704 of flip-flop 700 receives a logic 0. This lead is connected to the input of inverter 706 which has an output connected to lead 682. Consequently, during the setting function of the binary counter a logic 1 appears in line 682 while a logic 0 appears in blocking lead 156*a*. The significance of this logic will be explained later. Flip-flop 700 also includes a pulsing control lead 710 connected to the input lead 644 of the flip-flop FF1. A set line or lead 712 having a grounded capacitor 714 is connected to the output of a NOR gate 720 having inputs 722, 724, 726 and 728**. These inputs are connected to the Q terminals of flip-flops FF1-4, respectively. To complete the illustrated circuit, the output leads A1-4 for the counters are connected to the $\overline{Q}$ terminals of flip-flops FF1-4, respectively.

In operation, assume that the NAND gate 500 shown in FIG. 2 is in the condition for setting the logic patterns of setting device 10 into the various binary counters. A logic 1 then appears within line 160 of FIG. 2 and this creates a logic 0 in blocking lead 156a of FIG. 8. At the same time, a logic 1 appears at reset line 702 of control flip-flop 700. Consequently, the output of the flip-flop in line 704 is a logic 0 and lead 682 carries the logic 1.

The circuit in FIG. 8 is now in condition to be set with the logic pattern within digit coding unit 36 of FIG. 1, and this logic pattern appears in setting leads TWD1-4 when the control line B1 is energized by the oscillator 200 of FIG. 2. Consequently, the logic set within unit 36 appears in lines TWD1-4 of FIG. 8.

To simplify the explanation of the setting function, reference is made to FIG. 8A which is a truth table showing the various selected digits within unit 36, the set condition resulting from introduction of that logic pattern into the flip-flops FF1-4, the $\overline{Q}$ output logic of the flip-flops when the flip-flops are set with the logic pattern of unit 36, and the readout digit which corresponds to the logic pattern at the $\overline{Q}$ terminals and is transmitted to the readout terminals 600, 602, 604 and 606 of FIG. 2. Assume now that unit 36 is set to a selected digit 9 for the least significant decimal digit. TWD1-4 carries a standard binary coded decimal logic pattern 1001. With a logic 1 applied to setting circuit 660 of FIG. 8 at setting lead TWD1, the output of NOR gate 670 is a logic 0. The output of NOR gate 672 is a logic 1 because a logic 0 is in blocking lead 156a. Consequently, flip-flop FF1 is reset to logic 0 which is the inverse of the logic applied at TWD1.

Referring now to setting circuit 662, with a logic 0 applied through setting lead TWD2 and a logic 0 applied by lead **156*a*, the output of OR gate 684 is a logic 0. This causes NAND gate 680** to have a logic 1 output.

This sets off FF2 to logic 1 which is the inverse of the logic at lead TWD2. With logic 1 applied to lead 694, the output of NOR gate 692 is logic 0, and there is no resetting signal.

In summary, the flip-flops FF1-4 are set to the inverse of the logic pattern in the setting leads TWD1-4. This is shown in FIG. 8A for the various selected digits 0–9. Consequently, for selected digits 0–9 the flip-flops FF1-4 are set to binary logic corresponding to decimals 15–6, respectively. However, considering the $\overline{Q}$ terminals of the flip-flops in these respective set conditions, the logic patterns thereon are the inverse of the set logic patterns of the flip-flops FF1-4, therefore, the logic at the $\overline{Q}$ terminals corresponds to the input logic of the setting leads TWD1-4 which provides output patterns corresponding to the digits contained within the last column of FIG. 8A. Consequently, the logic applied by lines A1-4 to the readout terminals 600, 602, 604, 606 of FIG. 2 is the actual logic selected within the coding unit 36. Consequently, the readout of the various stages for the binary counter of FIG. 8 can be a standard readout for decoding standard binary logic in seven-Bar decoder 14 for direct readout. After the setting or loading function latch 372 in FIG. 2 is set and line 160 receives a logic 1. A logic 0 appears in line 160 and a logic 1 appears in blocking lead 156*a* irrespective of the signal in lines B1-4. This latches NOR gates 670, 672 of circuits 660, 666 with logic 0 outputs. Consequently, during the counting function flip-flops FF1 and FF4 cannot be set or reset. This is not the case for flip-flops FF2, FF3. The logic 1 within blocking lead 156a does latch OR gate 690 and NOR gate 692 of setting circuits 662, 664; therefore, the setting circuits are blocked from inputs by TWD2, TWD3. Consequently, the blocking lead 156*a* does block all setting circuits 132 from being influenced by the setting leads TWD1-4; however, the output of OR gate 690 in lead 684 is logic 1. Consequently, when a logic 0 appears in lead 682 the output of NAND gate 680 is logic 1 to reset flip-flops FF2, FF3 to a logic 1 condition. This is used in the rollover function so that when the flip-flops have counted down to a zero count in outputs A1-4, the flip-flops rollover to a condition where the output code in lines A1-4 is digit 9. This is best understood by considering FIG 8B which is a truth table showing the internal condition of the flip-flops FF1-4 as successive pulses are received in line 644 and the inverse or readout logic from these flip-flops which is to be transferred through leads A1-4 to the readout circuit of the counter unit A.

Referring to FIG. 8B, assume that the flip-flops FF1-4 are set to a digit 9 at the $\overline{Q}$ terminals. The internal setting of the flip-flops as appearing at the Q terminals represents a digit 6. A logic 1 at any Q terminal latches NOR gate 720 with a logic 0 output. This provides a logic 1 within line 682 and a logic 0 output for NAND gate 680 because lead 156*a* has a logic 1 during count down. During the counting down, the flip-flops continue to count up in binary logic from digit 6 to digit 15 which provides a binary logic output at leads A1-4 corresponding to digits 9–0. When the next pulse is received through lines 644,646, all flip-flops have a 0 logic at Q terminals. This tends to drive output lead 712 to a logic 1 against the action of capacitor 714. When the capacitor discharges, a logic 1 is applied to lead 712 which sets the flip-flop 700 with a logic 1 output at line 704. This produces a logic 0 at lead 682 and produces a logic 1 output for a NAND gate 680 of circuits 662, 664. Consequently, the flip-flops FF2, FF3 are set to logic 1 and the total logic within the flip-flop is 0110 corresponding to the decimal 6 digit, and the output logic in lines A1-4 rolls over to the digit 9. This causes a logic 1 to appear in leads 724 and 726 which resets the flip-flop 700 to a logic 0 output and again causes the NAND gate 680 to have a logic 0 output. Consequently, as the flop-flops FF1-4 count up from 6 to 15 the output of the flip-flops directed to the readout terminals on the integrated circuit 20 count down from 9 to 0. By using this arrangement, the external circuitry can be responsive to normal binary codes for the selected digits or the readout digits while the down counting function is accomplished by somewhat more common up counting binary counter circuits.

Having thus described our invention, we claim:

1. A digital counter adapted to count down from a selected decimal number having at least two selected digits, the first digit being the lesser significant and the second digit being the more significant, said counter comprising:

a. first and second binary down counter means connected in cascade with the first counter means including means for setting therein a first binary coded representation of said first digit, said second counter means including means for setting therein a second binary coded representation of said second digit and means for inhibiting said two setting means upon creation of a blocking signal;

b. said first counter means including means responsive to input pulses for counting down from said first set binary coded representation in digital increments to a zero count and means for then successively counting down from a binary coded representation of the digit nine to a zero count;

c. said second counter means including means responsive to each zero count of said first counter means for counting down from said second binary coded representation in digital increments to a zero count;

d. means responsive to a zero count in both of said digital counter means for producing an output from said digital counter, said zero counts coming when the number of input pulses corresponds to the selected decimal number;

e. said first counter means including a first group of output leads carrying binary logic representative of the decimal digit of said first counter means at any given time;

f. said second counter means including a second group of output leads carrying binary logic representative of the decimal digit of said second counter means at any given time;

g. first digit readout means for displaying a selected decimal digit upon receipt of binary logic representative of such decimal digit, said first readout means having a first input means for receiving binary logic representative of a decimal digit and a second input means for activating said first readout means;

h. second digit readout means for displaying a selected decimal digit upon receipt of binary logic representative of such decimal digit, said second readout means having a first input means for receiving binary logic representative of a decimal digit and a second input means for activating said second readout means;

i. means for creating a succession of first and second signals;

j. means responsive to creation of said first signal for connecting said first group of output leads to said first input means of both of said first and said second digit readout means and for simultaneously energizing only said second input means of said first digit readout means whereby said first signal causes said first readout means to display the digit of said first counter means at any given time;

k. means responsive to creation of said second signal for connecting said second group of output leads to said first input means of both of said first and second digit readout means and for simultaneously energizing only said second input means of said second digit readout means whereby said second signal causes said second readout means to display the digit of said second counter means at any given time;

l. means for applying a pulsing signal to said first counter means when said blocking signal is created; and, m. means for selectively creating said blocking signal whereby said counter means can count down from said binary coded representation.

2. A digital counter as defined in claim 1 including a source of a known clocking pulse signal and means for connecting said clocking pulse signal to said means for applying pulsing signal to said first counter means whereby said digital counter operates as a timer.

3. A digital counter as defined in claim 1 wherein said first input means of both of said first and second readout means are connected to a common third group of leads with each lead of said third group of leads having a first switching means for connecting said each lead of said third group to a lead of said first group of output leads and a second switching means for connecting said each lead to a lead of said second group of output leads, said first switching means being closed in response to creation of said first signal and said second switching means being closed in response to creation of said second signal.

4. A digital counter as defined in claim 3 wherein said first and second switching means are logic switching means.

5. A digital counter as defined in claim 4 wherein said first and second switching means are AND gates each having a first logic input connected to a lead from one of said first and second group of output leads and a second logic input connected to a source of one of said first or second signals.

6. A digital counter as defined in claim 1 including a first manually codable device for creating a first binary coded logic corresponding to said first selected decimal digit, a second manually codable device for creating a second binary coded logic corresponding to said second selected decimal digit, means for transferring said first coded logic into said first counter means and means for transferring said second coded logic into said second counter means.

7. A digital counter as defined in claim 6 wherein said first and second codable devices each include a plurality of electrical branches with each branch including a manually actuated switch and a diode with each branch corresponding to a first binary logic when said switch is closed and a second binary logic when said switch is opened.

8. A digital counter as defined in claim 6 wherein said first and second codable devices have an energizing input lead and each of said transferring means includes a group of leads extending from said respective codable devices, a group of setting leads with said group of leads from both of said codable devices being connected to said setting leads, means for connecting said group of setting leads to said setting means of both said first and said second counter means and means responsive to creation of said first signal for energizing said energizing lead of said first codable device and for simultaneously blocking said setting means of said second counter means, means responsive to creation of said second signal for energizing said energizing lead of said second codable device and for simultaneously blocking the setting means of said first counter means whereby said first and second counter means are set to the first and second binary codes, repsectively.

9. A digital counter adapted to count down from a selected decimal number having at least two selected digits, the first digit being the lesser significant and the second digit being the more significant, said counter comprising:

a. first and second binary down counter means connected to cascade with the first counter means including means for setting therein a first binary coded representation of said first digit and said second counter means including means for setting therein a second binary coded representation of said second digit;

b. said first counter means including means responsive to input pulses for counting down from said first set binary coded representation in digital increments to a zero count and means for then successively counting down from a binary coded representation of the digit nine to a zero count;

c. said second counter means including means responsive to each zero count of said first counter means for counting down from said second binary coded representation in digital increments to a zero count;

d. mean responsive to a zero count in both of said digital counter means for producing an output from said digital counter, said zero counts coming when the number of input pulses corresponds to the selected decimal number;

e. said first counter means including a first group of output leads carrying binary logic representative of the decimal digit of said first counter means at any given time;

f. said second counter means including a second group of output leads carrying binary logic representative of the decimal digit of said second counter means at any given time;

g. first digit readout means for displaying a selected decimal digit upon receipt of binary logic representative of such decimal digit, said first readout means having a first input means for receiving binary logic representative of a decimal digit and a second input means for activating said first readout means;

h. second digit readout means for displaying a selected decimal digit upon receipt of binary logic representative of such decimal digit, said second readout means having a first input means for receiving binary logic representative of a decimal digit and a second input means for activating said second readout means;

i. means for creating a succession of first and second signals;

j. means responsive to creation of said first signal for connecting said first group of output leads to said first input means of both of said first and said second digit readout means and for simultaneously energizing only said second input means of said first digit readout means whereby said first signal causes said first readout means to display the digit of said first counter means at any given time;

k. means responsive to creation of said second signal for connecting said second group of output leads to said first input means of both of said first and said second digit readout means and for simultaneously energizing only said second input means of said second digit readout means whereby said second signal causes said second readout means to display the digit of said second counter means at any given time;

l. means for applying a plusing signal to said first counter means;

m. a first manually codable device for creating a first binary coded logic corresponding to said first selected decimal digit, a second manually codable device for creating a second binary coded logic corresponding to said second selected decimal digit, means for transferring said first coded logic into said first counter means and means for transferring said second coded logic into said second counter means;

n. said first and second codable devices have an energizing input lead and each of said transferring means includes a group of leads extending from said respective codable devices, a group of setting leads with said group of leads from both of said codable devices being connected to said setting leads, means for connecting said group of setting leads to said setting means of both said first and said second counter means and means responsive to creation of said fist signal for energizing said energizing lead of said first codable device and for simultaneously blocking said setting means of said second counter means, means responsive to creation of said second signal for energizing said energizing lead of said second codable device and for simultaneously blocking the setting means of said first counter means whereby said first and second counter means are set to the first and second binary codes, respectively; and, o. counter blocking means for blocking both of said setting means of said first and said second counter means after said counter means are both set with said binary codes.

10. A digital counter means as defined in claim 9 wherein said counter blocking means includes a circuit responsive to creation of said succession of first and second signal for blocking said setting means of said first and said second counter means after a set minimum time exceeding the time for creating at least one first and one second signal.

11. A digital counter as defined in claim 10 wherein said circuit includes means for blocking said pulse applying means for a time at least as long as said minimum time.

12. A digital counter adapted to count down from a selected decimal number having at least two selected digits, the first digit being the lesser significant and the second digit being the more significant, said counter comprising:

a. first and second binary down counter means connected in cascade with the first counter means including means for setting therein a first binary coded representation of said first digit and said second counter means including means for setting therein a second binary coded representation of said second digit;

b. said first counter means including means responsive to input pulses for counting down from said first set binary coded representation in digital increments to a zero count and means for then successively counting down from a binary coded representation of the digit nine to a zero count;

c. said second counter means including means responsive to each zero count of said first counter means for counting down from said second binary coded representation in digital increments to a zero count;

d. means responsive to a zero count in both of said digital counter means for producing an output from said digital counter, said zero counts coming when the number of input pulses corresponds to the selected decimal number;

e. said first counter means including a first group of output leads carrying binary logic representative of the decimal digit of said first counter means at any given time;

f. said second counter means including a second group of output leads carrying binary logic representative of the decimal digit of said second counter means at any given time;

g. first digit readout means for displaying a selected decimal digit upon receipt of binary logic representative of such decimal digit, said first readout means having a first input means for receiving binary logic representative of a decimal digit and a second input means for activating said first readout means;

h. second digit readout means for displaying a selected decimal digit upon receipt of binary logic representative of such decimal digit, said second readout means having a first input means for receiving binary logic representative of a decimal digit and a second input means for activating said second readout means;

i. means for creating a succession of first and second signals;

j. means responsive to creation of said first signal for connecting said first group of output leads to said first input means of both of said first and said second digit readout means and for simultaneously energizing only said second input means of said first digit readout means whereby said first signal causes said first readout means to display the digit of said first counter means at any given time;

k. means responsive to creation of said second signal for connecting said second group of output leads to said first input means of both of said first and said second digit readout means and for simultaneously energizing only said second input means of said second digit readout means whereby said second signal causes said second readout means to display the digit of said second counter means at any given time;

l. means for applying a pulsing signal to said first counter means; and, m. first means for creating a first binary logic corresponding to the first decimal digit, second means for creating a second binary logic corresponding to the second decimal digit, a group of setting leads connected in parallel to the setting means of both first and second counter means, means responsive to creation of said first signal for applying said first logic to said group of setting leads and for simultaneously blocking said setting means of said second counter means, means responsive to creation of said second signal for applying said second binary logic to said group of setting leads and for simultaneously blocking said setting means of said first counter means and means for blocking the setting means of both said first and second counter means after said first and second binary logic has been set therein.

13. A digital counter as defined in claim 12 including means for blocking said pulse applying means until said binary logics have beet set into said first and second counter means.

14. A digital counter as defined in claim 13 wherein said pulse blocking means includes a circuit means controlled by creation of said first and second signals for blocking said pulse applying means for a time exceeding the time for creating at least one first signal and one second signal.

15. A digital counter adapted to count to a selected digital number having n digits, said counter comprising:

a. a binary down counter for each of said digits arranged in order of digital significance, said counters being connected in cascade from least significant digit to most significant digit whereby when a lesser significant digit counter counts down to zero the next higher significant digit counter counts down by one, each of said binary down counters including means for setting one of said selected digits thereby preparatory to down counting from said set digits;

b. a separate manually-adjustable binary-codable input means for setting each of said selected digits into one of said counters, each of said codable input means having an energizing lead and a plurality of separate binary-codable parallel circuits adapted to be coded in accordance with one of said selected digits;

c. each parallel circuit of said separate codable input means being connected to a common group of setting leads whereby said setting leads receive the set binary code of one of said binary-codable input means when said energizing lead of said one binary-codable input means is energized;

d. said common group of setting leads being connected to said setting means of each of said binary down counters;

e. means for blocking said setting means of each of said down counters;

f. circuit means for creating a distinctive binary signal for each of said digits;

g. means responsive to creation of each of said signals for energizing said blocking means of all counters except the counter corresponding to said digit to which said signal corresponds; and, h. means responsive to creation of each of said signals for energizing said energizing lead of said binary-codable input means corresponding to said digit to which said signal corresponds;

i. means for energizing all of said blocking means after all of said counters have been set to the selected digits; and, j. means for applying a series of pulses to said binary down counters for counting down from said set selected digits.

16. A digital counter adapted to count down from a decimal number having at least two selected digits, the first being the least significant and the second being the most significant, said counter comprising:

a. a binary down counter for each of said digits arranged in order of significance, said counters being connected in cascade from least significant digit to most significant digit whereby when the least significant digit counter counts to zero the most significant digit counter counts down one, said least significant digit counter including means for setting said least significant digit therein and said most significant digit counter including means for setting said most significant digit therein;

b. a first manually-adjustable binary-codable input means for setting said least significant digit into said least significant digit counter, a second manually-adjustable binary-codable input means for setting said most significant digit into said most significant digit counter;

c. said first input means having a first energizing lead and a plurality of separate circuits adapted to be binary-coded in accordance with said least significant digit;

d. said second input means having a second energizing lead and a plurality of separate circuits adapted to be binary-coded in accordance with said most significant digit;

e. said circuits being connected to a common group of setting leads whereby said group of setting leads receive the set binary code of one of said first and second input means;

f. said common group of setting leads being connected to said setting means of both of said counter means;

g. means for creating a first and a second signal in succession;

h. means responsive to creation of said first signal for energizing said first energizing lead;

i. means responsive to creation of said first signal for blocking said setting means of said most significant digit counter;

j. means responsive to creation of said second signal for energizing said second energizing lead;

k. mean responsive to creation of said second signal for blocking said setting means of said least significant digit counter;

l. means for blocking said setting means of both of said counters after said counters have been set; and, m. means for applying a series of pulses to said least significant digit counters for counting down said counters from said set selected digits.

17. A digital counter as defined in claim 16 wherein each of said parallel circuits includes a diode.

18. A digital counter as defined in claim 16 wherein each of said parallel circuits includes a manually operable switch.

19. A digital counter as defined in claim 16 wherein said means for creating a first and a second signal in succession comprises a set of flip-flop circuits connected together and driven by an oscillator.

20. A digital counter adapted to count down from at least two selected digits, the first being a least significant digit and the second being a most significant digit, said counter comprising:

a. a first binary counter means for counting down from said first selected digit to a zero count and then counting repeatedly from nine to a zero count when receiving input pulses;
b. a second binary counter means connected to said first counter means for counting down from said second selected digit one digit upon each zero count of said first counter means;
c. first codable means for setting said first digit into said first counter means, said first codable means including a first energizing lead, a plurality of circuits, and means for manually setting each of said circuits between logic 1 and logic 0, and a plurality of first output lead means connected to said circuits of said first codable means for transmitting the logic of said circuits from said first codable means upon energization of said first energizing lead;
d. second codable means for setting said second digit into said second counter means, said second codable means including a second energizing lead, a plurality of circuits, and means for manually setting each of said circuits of said second codable means between logic 1 and logic 0, and a plurality of second output lead means connected to said circuits of said second codable means for transmitting the logic of said circuits of said second codable means from said second codable means, uon energization of said second energizing lead;
e. a group of common leads connected to both of said first and second output lead means for alternatively receiving said logic of said first and said second codable means;
f. said group of common leads being connected to both of said first and said second counter means;
g. each of said counter means including means for setting said counter means upon receipt of logic from said common leads and means for blocking said setting means;
h. means for creating a first and a second control signal in sequence;
i. means responsive to creation of said first signal for energizing said first energizing lead and for energizing said blocking means of said second counter means whereby the logic of said first codable means is set into said first counter means;
j. means responsive to creation of said second signal for energizing said second energizing lead and for energizing said blocking means of said first counter means whereby the logic of said second codable means is set into said second counter means;
k. means for energizing the blocking means of both of said first and said second counter means after said counter means have been set; and,
l. means for applying a series of pulses to said first counter means.

21. A digital counter as defined in claim 20 wherein said manual setting means of each of said circuits includes a switch having an open position corresponding to a selected one of said logic 1 and logic 0 and a closed position corresponding to the other of said logic 1 and logic 0.

22. A digital counter as defined in claim 20 wherein each of said circuits includes a diode.

23. A digital counter as defined in claim 20 including a source of a known clocking pulse signal and means for connecting said clocking pulse signal to said means for applying pulses to said first binary counter means whereby said digital counter operates as a timer.

24. A digital counter for counting down from a selected first and second decimal digit with said first digit being the lesser significant and said second digit being the more significant, said counter comprising:

a. first and second binary down counter means connected in cascade, means for setting said first selected digit in said first counter means, means for setting said second digit in said second counter means and means for inhibiting said two setting means upon creation of a blocking signal;
b. means for applying a pulsing input signal to said first counter means for causing said first and second counter means to count down from said set condition when said blocking signal is created;
c. a first group of leads connected to said first counter means and carrying a binary logic corresponding to the digit of said first counter means at any given time;
d. a second group of leads connected to said second counter means and carrying a binary logic corresponding to the digit of said second counter means at any given time;
e. first readout means having a first energizing lead, a decimal display unit, a first input for receiving a binary code and means for converting said binary code to a decimal number in said unit;
f. second readout means having a second energizing lead, a decimal display unit, a second input for receiving a binary code and means for converting said binary code to a decimal number in said unit;
g. a group of readout leads connected in parallel with said first and said second inputs of said first and second readout means;
h. means for creating a succession of first and second signals;
i. means responsive to creation of said first signal for connecting said first group of leads to said group of readout leads and for simultaneously energizing said first energizing lead;
j. means responsive to creation of said second signal for connecting said second group of leads to said group of readout leads and for simultaneously energizing said seocnd energizing lead; and,
k. means for selectively creating said blocking signal whereby said counter means can count down from said selected digits in said counter means.

25. A digital counter as defined in claim 24 including a source of a known clocking pulse signal and means for connecting said clocking pulse signal to said means for applying a pulsing signal to said first counter means whereby said digital counter operates as a timer.

26. A digital counter as defined in claim 24 including a first manually codable device for creating a first binary-coded logic corresponding to said first selected decimal digit, a second manually codable device for creating a second binary-coded logic corresponding to said second selected decimal digit, means for transferring said first coded logic into said first counter means and means for transferring said second coded logic into said second counter means.

27. A digital counter as defined in claim 26 wherein said first and second codable devices each include a plurality of electrical branches with each branch including a manually-actuated switch and a diode with each branch corresponding to a first binary logic when said switch is closed and a second binary logic when said switch is opened.

28. A digital counter as defined in claim 26 wherein said first and second codable devices have an energizing input lead and each of said transferring means includes a group of leads extending from said respective codable devices, a group of setting leads with said group of leads from both of said codable devices being connected to said setting leads, means for connecting said group of setting leads to said setting means of both of said first and said second counter means and means responsive to creation of said first signal for energizing said energizing input lead of said first codable device and for simultaneously blocking said setting means of said second counter means, means responsive to creation of said second signal for energizing said energizing input lead of said second codable device and for simultaneously blocking said setting means of said first counter means whereby said first and second counter means are set to the first and second binary codes, respectively.

29. A digital counter for counting down from a selected first and second decimal digit with said first digit being the lesser significant and said second digit being the more significant, said counter comprising:

a. first and second binary down counter means connected in cascade, means for setting said first selected digit in said first counter means and means for setting said second digit in said second counter means;

b. means for applying a pulsing input signal to said first counter means for causing said first and second counter means to count down from said set condition;

c. a first group of leads connected to said first counter means and carrying a binary logic corresponding to the digit of said first counter means at any given time;

d. a second group of leads connected to said second counter means and carrying a binary logic corresponding to the digit of said second counter means at any given time;

e. first readout means having a first energizing lead, a decimal display unit, a first input for receiving a binary code and means for converting said binary code to a decimal number in said unit;

f. second readout means having a second energizing lead, a decimal display unit, a second input for receiving a binary code and means for converting said binary code to a decimal number in said unit;

g. a group of readout leads connected in parallel with said first and said second inputs of said first and second readout means;

h. means for creating a succession of first and second signals;

i. means responsive to creation of said first signal for connecting said first group of leads to said group of readout leads and for simultaneously energizing said first energizing lead;

j. means responsive to creation of said second signal for connecting said second group of leads to said group of readout leads and for simultaneously energizing said second energizing lead;

k. a first manually codable device for creating a first binary-coded logic corresponding to said first selected decimal digit, a second manually codable device for creating a second binary-coded logic corresponding to said second selected decimal digit, means for transferring said first coded logic into said first counter means and means for transferring said second coded logic into said second counter means;

l. said first and second codable devices have an energizing input lead and each of said transferring means include a group of leads extending from said respective codable devices, a group of setting leads with said group of leads from both of said codable devices being connected to said setting leads, means for connecting said group of setting leads to said setting means of both of said first and said second counter means and means responsive to creation of said first signal for energizing said energizing input lead of said first codable device and for simultaneously blocking said setting means of said second counter means, means responsive to creation of said second signal for energizing said energizing input lead of said second codable device and for simultaneously blocking said setting means of said first counter means whereby said first and second counter means are set to the first and second binary codes, respectively; and, m. counter blocking means for blocking both of said setting means of said first and said second counter means after said counter means are both set with said binary codes.

30. A digital counter as defined in claim 29 wherein said counter blocking means includes a circuit responsive to creation of said succession of first and second signals for blocking said setting means of said first and said second counter means after a set minimum time exceeding the time for creating at least one first and one second signal.

31. A digital counter as defined in claim 30 wherein said circuit includes means for blocking said pulse applying means for a time at least as long as said minimum time.

32. A digital counter for counting down from a selected first and second decimal digit with said first digit being the lesser significant and said second digit being the more significant, said counter comprising:

a. first and second binary down counter means connected in cascade, means for setting said first selected digit in said first counter means and means for setting said second digit in said second counter means;

b. means for applying a pulsing input signal to said first counter means for causing said first and second counter means to count down from said set condition;

c. a first group of leads connected to said first counter means and carrying a binary logic corresponding to the digit of said first counter means at any given time;
d. a second group of leads connected to said second counter means and carrying a binary logic corresponding to the digit of said second counter means at any given time;
e. first readout means having a first energizing lead, a decimal display unit, a first input for receiving a binary code and means for converting said binary code to a decimal number in said unit;
f. second readout means having a second energizing lead, a decimal display unit, a second input for reciving a binary code and means for converting said binary code to a decimal number in said unit;
g. a group of readout leads connected in parallel with said first and said second inputs of said first and second readout means;
h. means for creating a succession of first and second signals;
i. means responsive to creation of said first signal for connecting said first group of leads to said group of readout leads and for simultaneously energizing said first energizing lead;
j. means responsive to creation of said second signal for connecting said second group of leads to said group of readout leads and for simultaneously energizing said second energizing lead; and,
k. first means for creating a first binary logic corresponding to the first decimal digit, second means for creating a second binary logic corresponding to the second decimal digit, a group of setting leads connected in parallel to the setting means of both first and second counter means, means responsive to creation of said first signal for applying said first binary logic to said group of setting leads and for simultaneously blocking said setting means of said second counter means, means re-sponsive to creation of said second signal for applying said second binary logic to said group of setting leads and for simultaneously blocking said setting means of said first counter means and means for blocking the setting means of both said first and second counter means after said first and second binary logic has been set therein.

33. A digital counter as defined in claim 32 including means for blocking said pulse applying means until said binary logics hae been set into said first and second counter means.

34. A MOSFET integrated circuit adapted to be used in a digital counter having an external unit for creating first, second, third and fourth binary codes and for setting said codes into four binary counters located within said integrated circuit, said integrated circuit comprising:

a. first, second, third and fourth four stage binary counter means connected in cascade and each adapted to be set with a binary coded decimal digit;
b. four terminal means for receiving said first, second, third and fourth codes;
c. means for connecting said terminal means to the respective stages of each of said counter means;
d. separately controllable switching means between said connecting means and each of said binary counter means;
e. means for creating a succession of first, second, third and fourth multiplexing signals;
f. means responsive to creation of one of said signals for casuing said external unit to direct said first code to said terminal means;
g. means responsive to creation of said one signal for actuating said logic switching means associated with a selected one of said binary counters; and,
h. a first group of four leads connected to the respective stages of said first binary counter means for providing a readout code for said first counter means;
i. a second group of four leads connected to the respective stages of said second binary counter means for providing a readout code for said second counter means;
j. a third group of four leads connected to the respective stages of said third binary counter means for providing a readout code for said third counter means;
k. a fourth group of four leads connected to the respective stages of said fourth binary counter means for providing a readout code for said fourth counter means;
l. a logic switching means connected to each lead of said groups of leads and having outputs;
m. a first logic gate having inputs connected to the switching means of the first stage lead of each of said first, second, third and fourth groups of leads;
n. a second logic gate having inputs connected to the switching means of the second stage lead of each of said first, second, third and fourth groups of leads;
o. a third logic gate having inputs connected to the switching means of the third stage lead of each of said first, second, third and fourth groups of leads;
p. a fourth logic gate having inputs connected to the switching means of the fourth stage lead of each of said first, second, third and fourth groups of leads;
q. four terminal means for feeding a readout code from said integrated circuit, said terminal means each being connected to one of said logic gates; and,
r. means responsive to creation of said one signal for energizing said logic switching means associated with the four stages of said one binary counter means to pass the logic of said one binary counter to said four terminal means.

* * * * *

UNITED STATES PATENT OFFICE

CERTIFICATE OF CORRECTION

Patent No. 3,789,195 Dated January 29, 1974

Inventor(s) Carl H. Meier and Robert R. White

It is certified that error appears in the above-identified patent and that said Letters Patent are hereby corrected as shown below:

Change residence of inventors from:
"both of Scott, Iowa,"

to:
Davenport, Iowa and Bettendorf,
Iowa, respectively".

Change Assignee from: "Gulf Western, Inc."
to: Gulf & Western Industries, Inc.".

Column 6, line 41, cancel "four" and insert therefor "three".

Column 7, line 36, cancel "lads" and insert therefor "leads".

Column 8, line 39, cancel "in-verter" and insert therefor "inverter".

Column 8, line 42, after "stage I" insert "of".

Column 10, line 39, cancel "powerface" and insert therefor "power interface".

Column 18, line 8, cancel "flop-flops" and insert therefor "flip-flops".

Column 23, line 24, cancel "beet" and insert therefor "been".

UNITED STATES PATENT OFFICE

CERTIFICATE OF CORRECTION

Patent No. 3,789,195 Dated January 29, 1974

Inventor(s) Carl H. Meier and Robert R. White

It is certified that error appears in the above-identified patent and that said Letters Patent are hereby corrected as shown below:

Column 24, line 65, cancel "parallel" and insert therefor "separate".

Column 25, line 2, cancel "parallel" and insert therefor "separate"

Column 25, line 39, cancel "uon" and insert therefor "upon".

Column 29, line 49, cancel "hae" and insert therefor "have".

Column 30, line 12, cancel "casuing" and insert therefor "causing".

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*